United States Patent
Gong et al.

(10) Patent No.: US 11,197,292 B2
(45) Date of Patent: Dec. 7, 2021

(54) RESOURCE INDICATION METHOD AND DEVICE, BASE STATION, AND TERMINAL

(71) Applicant: XI'AN ZHONGXING NEW SOFTWARE CO., LTD., Xi'An (CN)

(72) Inventors: Yuhong Gong, Shenzhen (CN); Zhaohua Lu, Shenzhen (CN); Yijian Chen, Shenzhen (CN); Shujuan Zhang, Shenzhen (CN); Yuxin Wang, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 181 days.

(21) Appl. No.: 16/476,231

(22) PCT Filed: Dec. 9, 2017

(86) PCT No.: PCT/CN2017/115350
§ 371 (c)(1),
(2) Date: Jul. 5, 2019

(87) PCT Pub. No.: WO2018/126845
PCT Pub. Date: Jul. 12, 2018

(65) Prior Publication Data
US 2019/0357192 A1    Nov. 21, 2019

(30) Foreign Application Priority Data
Jan. 6, 2017   (CN) .......................... 201710011438.3

(51) Int. Cl.
  *H04W 72/04*   (2009.01)
  *H04L 5/00*    (2006.01)
  *H04W 72/08*   (2009.01)

(52) U.S. Cl.
CPC ......... *H04W 72/044* (2013.01); *H04L 5/0048* (2013.01); *H04W 72/042* (2013.01); *H04W 72/087* (2013.01)

(58) Field of Classification Search
CPC .. H04L 5/0048; H04L 5/0094; H04W 72/042; H04W 72/044; H04W 72/087
See application file for complete search history.

(56) References Cited

U.S. PATENT DOCUMENTS

| 2012/0014330 A1* | 1/2012 | Damnjanovic ......... H04L 5/003 370/329 |
| 2016/0044665 A1* | 2/2016 | Novlan ............. H04W 72/0406 370/336 |

(Continued)

FOREIGN PATENT DOCUMENTS

| CN | 101442772 A | 5/2009 |
| CN | 101547482 A | 9/2009 |

(Continued)

OTHER PUBLICATIONS

Extended European Search Report of corresponding European Patent Application No. 17890012.2—6 pages (dated Aug. 10, 2020).

(Continued)

*Primary Examiner* — Awet Haile
(74) *Attorney, Agent, or Firm* — Knobbe Martens Olson & Bear LLP

(57) ABSTRACT

Provided are a resource indication method, a resource indication device, a base station and a terminal. The method includes: defining, in a hierarchical nesting manner, resource units of multiple granularities for a communication signal; and indicating one or more of the resource units to the terminal. With the present disclosure, the problem in the related art that the communication signal transmission on a full system bandwidth has high complexity and low effi- (Continued)

ciency is solved, and the purpose of flexibly defining and indicating the resources of the communication signal is realized. The present disclosure is not only easy to operate, but also is favorable to improving the transmission efficiency of communication signal.

17 Claims, 6 Drawing Sheets

(56) References Cited

U.S. PATENT DOCUMENTS

| | | | |
|---|---|---|---|
| 2016/0227520 | A1 | 8/2016 | Davydov et al. |
| 2016/0227541 | A1 | 8/2016 | Damnjanovic et al. |
| 2019/0297614 | A1* | 9/2019 | Pajukoski ............ H04L 5/0053 |

FOREIGN PATENT DOCUMENTS

| | | |
|---|---|---|
| CN | 102124813 A | 7/2011 |
| CN | 102187314 A | 9/2011 |
| CN | 102598531 A | 7/2012 |
| CN | 104349458 A | 2/2015 |
| CN | 106304354 A | 1/2017 |
| EP | 2756389 B1 | 7/2014 |
| WO | 2016123473 A1 | 8/2016 |

OTHER PUBLICATIONS

International Search Report of corresponding PCT Application No. PCT/CN2017/115350—4 pages (dated Mar. 6, 2018).
"Study on New Radio Access Technology", RP-162201; 3GPP TSG RAN Meeting #74 (Dec. 8, 2016).
First Search Report for CN 201710011438.3 dated Sep. 15, 2021.
First Office Action for CN 201710011438.3 dated Sep. 23, 2021.

* cited by examiner

RESOURCE INDICATION METHOD AND DEVICE, BASE STATION, AND TERMINAL

CROSS REFERENCE TO RELATED APPLICATIONS

This is a U.S. National Stage Application, filed under 35 U.S.C. 371, of International Patent Application No. PCT/CN2017/115350, filed on Dec. 9, 2017, which claims priority to Chinese patent application No. 201710011438.3 filed on Jan. 6, 2017, contents of both of which are incorporated herein by reference in their entireties.

TECHNICAL FIELD

The present disclosure relates to the field of communications and, in particular, to a resource indication method and device, a base station and a terminal.

BACKGROUND

In order to meet the increasing demand for wireless data services since the deployment of 4G (4th generation) communication systems, efforts have been made to develop improved 5G (5th generation) communication systems. The 5G communication system is also referred to as "post 4G network" or "post LTE (Long Term Evolution) system".

It is considered that the 5G communication system is implemented at higher frequency bands (e.g. higher than 3 GHz) so as to achieve a higher data rate. The high-frequency communication has the following characteristics: serious path loss and penetration loss, and the spatial propagation of the high-frequency communication is closely related to the atmosphere. Since the high frequency signal has an extremely short wavelength, a large number of small antenna arrays may be applied to obtain a more accurate beam direction by means of the beamforming technology. A major characteristic of the high-frequency communication is improving the covering capability of high-frequency signal and compensating transmission loss by using the advantages of a narrow beam technology.

In the LTE system, a Physical Downlink Control Channel (PDCCH) is transmitted on a full system bandwidth in a discrete manner, and an enhanced PDCCH (ePDCCH) is transmitted on a Resource of a limited number of configured physical resource blocks (PRBs) in a discrete manner or in a centralized manner. The limited number of PRBs are contiguous in a frequency domain. In the LTE system, an important role of the PDCCH is to indicate transmission related information of the data channel to the terminal.

Since the 5G communication system has a large system bandwidth, a complexity of a blind detection by the terminal may be large if the control channel is allowed to be transmitted over the full system bandwidth. On the other hand, since different terminals may support different bandwidth capabilities, the terminal does not need to transmit signals or channels over the full system bandwidth.

Therefore, in the related art, there are problems of high complexity and low efficiency in transmitting the communication signal over the full system bandwidth.

SUMMARY

Embodiments of the disclosure provide a resource indication method, a resource indication device, a base station and a terminal, and aim to at least solve the problem in the related art that the communication signal transmission on a full system bandwidth has high complexity and low efficiency.

According to an embodiment of the present disclosure, a resource indication method is provided, and the method includes: defining, in a hierarchical nesting manner, resource units of multiple granularities for a communication signal; and indicating one or more of the resource units to a terminal.

Alternatively, the communication signal includes at least one of: a control signal, a data signal, a demodulation reference signal, a sounding reference signal, a positioning signal, a synchronization signal, a random access signal, a time domain tracking reference signal and/or frequency domain tracking reference signal, or a radio resource management measurement reference signal.

Alternatively, the resource unit includes at least one of: a sub-band in a frequency domain or a time unit group in a time domain; where the sub-band includes one or more physical resource blocks in the frequency domain; the time unit group includes one or more time units, and the time unit includes one of: a slot, a subframe, a symbol, a frame, or a mini-slot.

Alternatively, defining, in a hierarchical nesting manner, resource units of multiple granularities for a communication signal includes: dividing resources for transmitting the communication signal into multiple levels to obtain multiple levels of resource units, where each level of resource units include at least one granularity of resource units, and the multiple levels of resource units have a nested relationship.

Alternatively, dividing the resources for transmitting the communication signal into multiple levels to obtain multiple levels of resource units includes: dividing the resources for transmitting the communication signal into N levels, where the resources are divided into $L_i$ resource units in the ith level, and N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers.

Alternatively, dividing the resources for transmitting the communication signal into N levels includes: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1} = L_i \times Q$.

Alternatively, any two resource units at the same level have the same granularity.

Alternatively, the method further includes: numbering the resource units of multiple granularities in a predefined manner.

Alternatively, numbering the resource units of multiple granularities in the predefined manner includes at least one of: according to a largest-to-smallest order or a smallest-to-largest order of the granularities of the resource units, numbering the resource units from a smallest number to a largest number; according to a largest-to-smallest order or a smallest-to-largest order of hierarchical indexes of the resource units, numbering the resource units from a smallest number to a largest number; according to a highest-to-lowest order or a lowest-to-highest order or a center-to-edge order of frequency domains of the resource units, numbering the resource units from a smallest number to a largest number; or according to a front-to-end order or an end-to-front order of time domains of the resource units, numbering the resource units from a smallest number to a largest number.

Alternatively, numbering the resource units of multiple granularities in the predefined manner includes: respectively numbering resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, numbering the resource units of multiple granularities in the predefined manner includes: respectively numbering one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: numbering the one or more resource units with a smaller granularity from a smallest number to a largest number according to a highest-to-lowest order or a lowest-to-highest order or a center-to-edge order of frequency domains of the one or more resource units; or, numbering the one or more resource units with a smaller granularity from a smallest number to a largest number according to a front-to-end order or an end-to-front order of time domains of the one or more resource units.

Alternatively, numbering the resource units with the multiple granularities in the predefined manner includes: numbering resource units whose frequency domains are closely adjacent to a center frequency with a same number; or numbering resource units whose frequency domains have the same distance from the center frequency domain with the same number.

Alternatively, one or more of the resource units are indicated to the terminal by the following manner: indicating one or more of the resource units to the terminal by indicating one or more numbers to the terminal, where one number corresponds to one or more resource units.

Alternatively, one or more of the resource units are indicated to the terminal by the following manner: indicating one or more of the resource units to the terminal via one or more sets of signaling, where one set of signaling is configured for indicating one number.

Alternatively, the method further includes: indicating, to the terminal, resource unit granularity information in the hierarchical nesting manner and/or a number of levels corresponding to the hierarchical nesting manner.

Alternatively, the resource unit granularity information in the hierarchical nesting manner and/or the number of levels corresponding to the hierarchical nesting manner is indicated to the terminal by at least one of the following manners: indicating according to a system bandwidth, where the system bandwidth has a predefined corresponding relation with the hierarchical nesting manner; indicating by a broadcast channel; or indicating by a synchronization signal.

Alternatively, indicating one or more of the resource units to the terminal includes: indicating one or more of the resource units to the terminal via multiple levels of signaling, where each of the multiple levels of signaling is configured for indicating at least one granularity of resource units among the resource units of multiple granularities.

Alternatively, the multiple levels of signaling include physical control signaling carried by multiple levels of physical control channels; or the multiple levels of signaling at least include higher layer signaling and physical layer control signaling.

Alternatively, the resource units of multiple granularities have a same subcarrier spacing; and/or, the resource units of multiple granularities have a same symbol length and cyclic shift length.

Alternatively, the resources for transmitting the communication signal include one of: frequency domain resources corresponding to the system bandwidth, frequency domain resources supported by the terminal, specified frequency domain resources among the frequency domain resources corresponding to the system bandwidth, and specified frequency domain resources among the frequency domain resources supported by the terminal.

According to another embodiment of the present disclosure, a resource indication method is provided. The method includes: defining, in a hierarchical nesting manner, resource units of multiple granularities for a communication signal; receiving, from a base station, indication information for indicating one or more resource units of the resource units; and attempting to receive the communication signal on the one or more resource units indicated by the indication information.

Alternatively, the communication signal includes at least one of: a control signal, a data signal, a demodulation reference signal, a sounding reference signal, a positioning signal, a synchronization signal, a random access signal, a time domain tracking reference signal and/or frequency domain tracking reference signal, or a radio resource management measurement reference signal.

Alternatively, the resource unit includes at least one of: a sub-band in a frequency domain or a time unit group in a time domain. The sub-band includes one or more physical resource blocks in the frequency domain. The time unit group includes one or more time units, and the time unit includes one of: a slot, a subframe, a symbol, a frame, or a mini-slot.

Alternatively, defining, in a hierarchical nesting manner, resource units of multiple granularities for a communication signal includes: dividing resources for receiving the communication signal into multiple levels to obtain multiple levels of resource units, where each level of resource units include at least one granularity of resource units, and the multiple levels of resource units have a nested relationship.

Alternatively, dividing the resources for receiving the communication signal into multiple levels to obtain multiple levels of resource units includes: dividing resources for transmitting the communication signal into N levels, where an ith level includes $L_i$ resource units, the N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers.

Alternatively, dividing the resources for receiving the communication signal into N levels includes: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, any two resource units at the same level have the same granularity.

Alternatively, the method further includes numbering the resource units of multiple granularities in a predefined manner.

Alternatively, numbering the resource units in multiple granularities in the predefined manner includes at least one of: according to a largest-to-smallest order or a smallest-to-largest order of the granularities of the resource units, numbering the resource units from a smallest number to a largest number; according to a largest-to-smallest order or a smallest-to-largest order of hierarchical indexes of the resource units, numbering the resource units from a smallest number to a largest number; according to a highest-to-lowest order or a lowest-to-highest order or a center-to-edge order of frequency domains of the resource units, numbering the resource units from a smallest number to a largest number; or according to a front-to-end order or an end-to-front order of time domains of the resource units, numbering the resource units from a smallest number to a largest number.

Alternatively, numbering the resource units of multiple granularities in the predefined manner includes: respectively numbering resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, numbering the resource units of multiple granularities in the predefined manner includes: respectively numbering one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: according to a highest-to-lowest order or a lowest-to-highest order or a center-to-edge order of frequency domains of the one or more resource units, numbering the one or more resource units with a smaller granularity from a smallest number to a largest number; or according to a front-to-end order or an end-to-front order of time domains of the one or more resource units, numbering the one or more resource units with a smaller granularity from a smallest number to a largest number.

Alternatively, numbering the resource units of the multiple granularities in the predefined manner includes: numbering resource units whose frequency domains are closely adjacent to a center frequency with a same number; or numbering resource units whose frequency domains have the same distance from the center frequency domain with the same number.

Alternatively, the indication information indicating one or more of the resource units is received from the base station in the following manner: the indication information through which the base station indicates one or more of the resource units is received by receiving one or more numbers indicated by the base station, where one number corresponds to one or more resource units.

Alternatively, the indication information indicating one or more of the resource units is received from the base station in the following manner: the indication information through which the base station indicates one or more of the resource units is received via one or more sets of signaling, where one set of signaling indicates one number.

Alternatively, before defining, in the hierarchical nesting manner, the resource units of multiple granularities for the communication signal, the method further includes acquiring resource unit granularity information of the hierarchical nesting manner and/or a number of levels corresponding to the hierarchical nesting manner.

Alternatively, the resource unit granularity information of the hierarchical nesting manner and/or the number of levels corresponding to the hierarchical nesting manner is acquired in at least one of the following manners: the resource unit granularity information of the hierarchical nesting manner and/or the number of levels corresponding to the hierarchical nesting manner is acquired according to a system bandwidth, where the system bandwidth has a predefined corresponding relation with the hierarchical nesting manner; the resource unit granularity information of the hierarchical nesting manner and/or the number of levels corresponding to the hierarchical nesting manner is acquired by an indication of a broadcast channel; or the resource unit granularity information of the hierarchical nesting manner and/or the number of levels corresponding to the hierarchical nesting manner is acquired by an indication of a synchronization signal.

Alternatively, receiving the indication information through which the base station indicates one or more of the resource units includes: receiving the indication information through which the base station indicates one or more of the resource units by receiving multiple levels of signaling, where each of the multiple levels of signaling is configured for indicating at least one granularity of resource units among the resource units of multiple granularities.

Alternatively, the multiple levels of signaling are physical control signaling carried by multiple levels of physical control channels; or the multiple levels of signaling at least include higher layer signaling and physical layer control signaling.

Alternatively, the resource units of multiple granularities have a same subcarrier spacing; and/or, the resource units of multiple granularities have a same symbol length and cyclic shift length.

Alternatively, the resources used for receiving the communication signal include one of: frequency domain resources corresponding to the system bandwidth, frequency domain resources supported by the terminal, specified frequency domain resources among the frequency domain resources corresponding to the system bandwidth, and specified frequency domain resources among the frequency domain resources supported by the terminal.

According to an embodiment of the present disclosure, a resource indication device is provided. The device includes: a first determining module, which is configured to define resource units of multiple granularities for a communication signal in a hierarchical nesting manner; and an indicating module, which is configured to indicate one or more of the resource units to the terminal.

Alternatively, the first determining module includes: a first determining unit, which his configured to divide resources for transmitting the communication signal into multiple levels to obtain multiple levels of resource units. Each level of resource units at least include at least one granularity of resource units, and the multiple levels of resource units have a nested relationship.

Alternatively, the first determining unit is further configured to divide the resources for transmitting the communication signal into N levels. The ith level includes $L_i$ resource units, and the N levels of resource units satisfy $L_0 \leq L_1 \leq \ldots \leq L_{N-1}$. $i \in \{0 \sim N-1\}$, N is an integer greater than 1, and i and $L_i$ are both nonnegative integers.

Alternatively, the first determining unit is further configured that: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, the device further includes: a first numbering module, which is configured to number the resource units of multiple granularities in a predefined manner.

Another embodiment of the present disclosure provides a base station. The base station includes any device described above.

According to an embodiment of the present disclosure, another resource indication device is provided. The device includes: a second determining module, which is configured to define resource units of multiple granularities for a communication signal in a hierarchical nesting manner; a first receiving module, which his configured to receive indication information from a base station for indicating one or more of the resource units; and a second receiving module, which is configured to attempt to receive the communication signal on the one or more resource units indicated by the indication information.

Alternatively, the second determining module includes: a second determining unit, which is configured to divide resources for receiving the communication signal into multiple levels to obtain multiple levels of resource units. Each level of resource units include at least granularity of resource units, and the multiple levels of resource units have a nested relationship.

Alternatively, the second determining unit is further configured to divide the resources for transmitting the communication signal into N levels. The ith level includes $L_i$ resource units, and the N levels of resource units satisfy $L_0 \leq L_1 \leq \ldots \leq L_{N-1}$. i∈{0~N−1}, N is an integer greater than 1, and i and $L_i$ are both nonnegative integers Alternatively, the second determining unit is further configured that: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, the device further includes: a second numbering module, configured to number the resource units of multiple granularities in the predefined manner.

Another aspect of the present disclosure provides a base station. The base station includes any device described above.

Another embodiment of the present disclosure further provides a storage medium. The storage medium is configured to store program codes for executing following steps: defining resource units of multiple granularities for a communication signal in a hierarchical nesting manner; and indicating one or more of the resource units to the terminal.

Alternatively, the storage medium is further configured to store program codes for executing the following step: the communication signal includes at least one of: a control signal, a data signal, a demodulation reference signal, a sounding reference signal, a positioning signal, a synchronization signal, a random access signal, a time domain tracking reference signal and/or a frequency domain tracking reference signal, or a radio resource management measurement reference signal.

Alternatively, the storage medium is further configured to store program codes for executing the following step: the resource unit includes at least one of: a sub-band in a frequency domain or a time unit group in a time domain. The sub-band includes one or more physical resource blocks in the frequency domain. The time unit group includes one or more time units. The time unit includes one of: a slot, a subframe, a symbol, a frame, or a mini-slot.

Alternatively, the storage medium is further configured to store program codes for executing the following step: defining resource units of multiple granularities for a communication signal in a hierarchical nesting manner includes: dividing resources for transmitting the communication signal into multiple levels to obtain multiple levels of resource units, where each level of resource units at least include a resource unit with one granularity, and the multiple levels of resource units have a nested relationship.

Alternatively, the storage medium is further configured to store program codes for executing the following step: dividing the resources for transmitting the communication signal into multiple levels to obtain multiple levels of resource units includes: dividing the resources for transmitting the communication signal into N levels, where the ith level includes $L_i$ resource units, and N levels of resource units satisfy $L_0 \leq L_1 \leq \ldots \leq L_{N-1}$, where i∈{0~N−1}, N is an integer greater than 1, and i and $L_i$ are both nonnegative integers.

Alternatively, the storage medium is further configured to store program codes for executing the following step: dividing the resources for receiving the communication signal into N levels includes: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, the storage medium is further configured to store program codes for executing the following step: any two resource units at the same level have the same granularity.

Alternatively, the storage medium is further configured to store program codes for executing the following step: the method further includes numbering the resource units of multiple granularities in the predefined manner.

Alternatively, the storage medium is further configured to store program codes for executing the following step: according to a largest-to-smallest order or a smallest-to-largest order of the granularities of the resource units, numbering the resource units from a smallest number to a largest number; according to a largest-to-smallest order or a smallest-to-largest order of hierarchical indexes of the resource units, numbering the resource units from a smallest number to a largest number; according to a highest-to-lowest order or a lowest-to-highest order or a center-to-edge order of frequency domains of the resource units, numbering the resource units from a smallest number to a largest number; or according to a front-to-end order or an end-to-front order of time domains of the resource units, numbering the resource units from a smallest number to a largest number.

Alternatively, the storage medium is further configured to store program codes for executing the following step: numbering the resource units of multiple granularities in the predefined manner includes: respectively numbering resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, the storage medium is further configured to store program codes for executing the following step: numbering the resource units of multiple granularities in the predefined manner includes: respectively numbering one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: numbering the one or more resource units with a smaller granularity from a smallest number to a largest number according to a highest-to-lowest order or a lowest-to-highest order or a center-to-edge order of frequency domains of the one or more resource units; or, numbering the one or more resource units with a smaller granularity from a smallest number to a largest number according to a front-to-end order or an end-to-front order of time domains of the one or more resource units.

Alternatively, the storage medium is further configured to store program codes for executing the following step: numbering the resource units of the multiple granularities in the predefined manner includes: numbering resource units whose frequency domains are closely adjacent to a center frequency with a same number; or numbering resource units whose frequency domains have the same distance from the center frequency domain with the same number.

Alternatively, the storage medium is further configured to store program codes for executing the following step: one or more of the resource units are indicated to the terminal by the following manner: indicating one or more of the resource units to the terminal by indicating one or more numbers to the terminal, where one number corresponds to one or more resource units.

Alternatively, the storage medium is further configured to store program codes for executing the following step: one or more of the resource units are indicated to the terminal by the following manner: indicating one or more of the resource units to the terminal via one or more sets of signaling, where one set of signaling is configured for indicating one number.

Alternatively, the storage medium is further configured to store program codes for executing the following step: the method further includes: indicating, to the terminal, resource unit granularity information in the hierarchical nesting manner and/or a number of levels corresponding to the hierarchical nesting manner.

Alternatively, the storage medium is further configured to store program codes for executing the following step: the resource unit granularity information in the hierarchical nesting manner and/or the number of levels corresponding to the hierarchical nesting manner is indicated to the terminal by at least one of the following manners: indicating according to a system bandwidth, where the system bandwidth has a predefined corresponding relation with the hierarchical nesting manner; indicating by a broadcast channel; or indicating by a synchronization signal (or synchronization channel).

Alternatively, the storage medium is further configured to store program codes for executing the following step: indicating one or more of the resource units to the terminal includes: indicating one or more of the resource units to the terminal via multiple levels of signaling, where each of the multiple levels of signaling is configured for indicating at least one granularity of resource units among the resource units of multiple granularities.

Alternatively, the storage medium is further configured to store program codes for executing the following step: the multiple levels of signaling include physical control signaling carried by multiple levels of physical control channels; or the multiple levels of signaling at least include higher layer signaling and physical layer control signaling.

Alternatively, the storage medium is further configured to store program codes for executing the following step: the resource units of multiple granularities have a same subcarrier spacing; and/or, the resource units of multiple granularities have a same symbol length and cyclic shift length.

Alternatively, the storage medium is further configured to store program codes for executing the following step: the resources used for transmitting the communication signal include one of: frequency domain resources corresponding to the system bandwidth, frequency domain resources supported by the terminal, specified frequency domain resources in the frequency domain resources corresponding to the system bandwidth, and specified frequency domain resources in the frequency domain resources supported by the terminal.

Another embodiment of the present disclosure further provides a storage medium. The storage medium is configured to store program codes for executing the following step: defining in a hierarchical nesting manner resource units of multiple granularities for a communication signal; receiving indication information by which a base station indicates one or more of the resource units; and attempting to receive the communication signal on the one or more resource units indicated by the indication information.

Alternatively, the storage medium is further configured to store program codes for executing the following step: the communication signal includes at least one of: a control signal, a data signal, a demodulation reference signal, a sounding reference signal, a positioning signal, a synchronization signal, a random access signal, a time domain tracking reference signal and/or a frequency domain tracking reference signal, or a radio resource management measurement reference signal.

Alternatively, the storage medium is further configured to store program codes for executing the following step: the resource unit includes at least one of: a sub-band in a frequency domain or a time unit group in a time domain. The sub-band includes one or more physical resource blocks in the frequency domain. The time unit group includes one or more time units, and the time unit includes one of: a slot, a subframe, a symbol, a frame, or a mini-slot.

Alternatively, the storage medium is further configured to store program codes for executing the following step: defining in a hierarchical nesting manner resource units of multiple granularities for a communication signal includes: dividing resources for receiving the communication signal into multiple levels to obtain multiple levels of resource units, where each level of resource units include at least one granularity of resource units, and the multiple levels of resource units have a nested relationship.

Alternatively, the storage medium is further configured to store program codes for executing the following step: dividing the resources for receiving the communication signal into multiple levels to obtain multiple levels of resource units includes: dividing resources for transmitting the communication signal into N levels, where an ith level includes $L_i$ resource units, the N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers.

Alternatively, the storage medium is further configured to store program codes for executing the following step: dividing the resources for receiving the communication signal into N levels includes: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, the storage medium is further configured to store program codes for executing the following step: any two resource units at the same level have the same granularity.

Alternatively, the storage medium is further configured to store program codes for executing the following step: the method further includes numbering the resource units of multiple granularities in a predefined manner.

Alternatively, the storage medium is further configured to store program codes for executing the following step: numbering the resource units in multiple granularities in the predefined manner includes at least one of: according to a largest-to-smallest order or a smallest-to-largest order of the granularities of the resource units, numbering the resource units from a smallest number to a largest number; according to a largest-to-smallest order or a smallest-to-largest order of hierarchical indexes of the resource units, numbering the resource units from a smallest number to a largest number; according to a highest-to-lowest order or a lowest-to-highest order or a center-to-edge order of frequency domains of the resource units, numbering the resource units from a smallest number to a largest number; or according to a front-to-end order or an end-to-front order of time domains of the resource units, numbering the resource units from a smallest number to a largest number.

Alternatively, the storage medium is further configured to store program codes for executing the following step: numbering the resource units of multiple granularities in the predefined manner includes: respectively numbering resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, the storage medium is further configured to store program codes for executing the following step: numbering the resource units of multiple granularities in the predefined manner includes: respectively numbering one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: according to a highest-to-lowest order or a lowest-to-highest order or a center-to-edge order of frequency domains of the one or more resource units, numbering the one or more resource units with a smaller granularity from a smallest number to a largest number; or according to a front-to-end order or an end-to-front order of time domains of the one or more resource units, numbering the one or more resource units with a smaller granularity from a smallest number to a largest number.

Alternatively, the storage medium is further configured to store program codes for executing the following step: numbering the resource units of the multiple granularities in the predefined manner includes: numbering resource units whose frequency domains are closely adjacent to a center frequency with a same number; or numbering resource units whose frequency domains have the same distance from the center frequency domain with the same number.

Alternatively, the storage medium is further configured to store program codes for executing the following step: the indication information indicating one or more of the resource units is received from the base station in the following manner: the indication information through which the base station indicates one or more of the resource units is received by receiving one or more numbers indicated by the base station, where one number corresponds to one or more resource units.

Alternatively, the storage medium is further configured to store program codes for executing the following step: the indication information indicating one or more of the resource units is received from the base station in the following manner: the indication information through which the base station indicates one or more of the resource units is received via one or more sets of signaling, where one set of signaling indicates one number.

Alternatively, the storage medium is further configured to store program codes for executing the following step: before defining in the hierarchical nesting manner the resource units of multiple granularities for the communication signal, the method further includes acquiring resource unit granularity information of the hierarchical nesting manner and/or a number of levels corresponding to the hierarchical nesting manner.

Alternatively, the storage medium is further configured to store program codes for executing the following step: the resource unit granularity information of the hierarchical nesting manner and/or the number of levels corresponding to the hierarchical nesting manner is acquired in at least one of the following manners: the resource unit granularity information of the hierarchical nesting manner and/or the number of levels corresponding to the hierarchical nesting manner is acquired according to a system bandwidth, where the system bandwidth has a predefined corresponding relation with the hierarchical nesting manner; the resource unit granularity information of the hierarchical nesting manner and/or the number of levels corresponding to the hierarchical nesting manner is acquired by an indication of a broadcast channel; or the resource unit granularity information of the hierarchical nesting manner and/or the number of levels corresponding to the hierarchical nesting manner is acquired by an indication of a synchronization signal.

Alternatively, the storage medium is further configured to store program codes for executing the following step: the storage medium being further configured to store program codes for executing the following step: receiving the indication information through which the base station indicates one or more of the resource units includes: receiving the indication information through which the base station indicates one or more of the resource units by receiving multiple levels of signaling, where each of the multiple levels of signaling is configured for indicating at least one granularity of resource units among the resource units of multiple granularities.

Alternatively, the storage medium is further configured to store program codes for executing the following step: the multiple levels of signaling are physical control signaling carried by multiple levels of physical control channels; or the multiple levels of signaling at least include higher layer signaling and physical layer control signaling.

Alternatively, the storage medium is further configured to store program codes for executing the following step: the resource units of multiple granularities have a same subcarrier spacing; and/or, the resource units of multiple granularities have a same symbol length and cyclic shift length.

Alternatively, the storage medium is further configured to store program codes for executing the following step: the resources used for receiving the communication signal include one of: frequency domain resources corresponding to the system bandwidth, frequency domain resources supported by the terminal, specified frequency domain resources in the frequency domain resources corresponding to the system bandwidth, and specified frequency domain resources in the frequency domain resources supported by the terminal.

According to the present disclosure, resource units of multiple granularities are defined in a hierarchical nested manner for the communication signal, and one or more of the resource units are indicated to the terminal, so that problem in the related art that the communication signal transmission on a full system bandwidth has high complexity and low efficiency is solved, and the purpose of flexibly defining and indicating the resources of the communication signal is realized. The present disclosure is not only easy to operate, but also is favorable to improving the transmission efficiency of communication signal.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
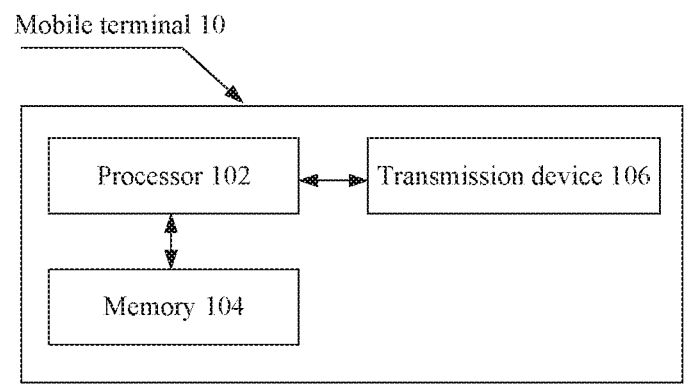
FIG. 1 is a block diagram of a hardware configuration of a mobile terminal of a resource indication method according to an embodiment of the present disclosure.

The method embodiment provided by the embodiment 1 of the present application may be executed on a mobile terminal, a computer terminal or other similar computing devices. An example in which the method is executed on the mobile terminal is described below. FIG. 1 is a block diagram of a hardware configuration of a mobile terminal of a resource indication method according to the embodiment of the present disclosure. As shown in FIG. 1, a mobile terminal 10 may include one or more (only one processor is shown in FIG. 1) processors 102 (the processor 102 may include, but is not limited to, a processing device such as a microcontroller unit (MCU) and a field programmable gate array (FPGA)), a memory 104 used for storing data, and a transmission device 106 used for implementing a communication function. It should be understood by those skilled in the art that the structure shown in FIG. 1 is merely illustrative and not intended to limit the structure of the electronic device described above. For example, the mobile terminal 10 may further include more or fewer components than the components shown in FIG. 1 or may have a configuration different from that shown in FIG. 1.

The memory 104 may be used for storing software programs and modules of application software, such as program instructions/modules corresponding to the resource indication method in the embodiments of the present disclosure. The processor 102 executes the software programs and modules stored in the memory 104 so as to perform various function applications and data processing, that is, to implement the method described above. The memory 104 may include a high-speed random access memory, and may further include a nonvolatile memory, such as one or more magnetic storage device, flash memories or other nonvolatile solid-state memories. In some examples, the memory 104 may further include memories that are remotely disposed relative to the processor 102. These remote memories may be connected to the mobile terminal 10 via a network. Examples of the preceding network include, but are not limited to, the Internet, an intranet, a local area network, a mobile communication network and a combination thereof.

The transmission device 106 is configured to receive or send data via a network. Specific examples of such a network may include a wireless network provided by a communication provider of the mobile terminal 10. In one example, the transmission device 106 includes a network interface controller (NIC), which may be connected to other network devices via a base station and thus be capable of communicating with the Internet. In an example, the transmission device 106 may be a Radio Frequency (RF) module, which is used for communicating with the Internet in a wireless way.

In the LTE system, the PDCCH is configured to indicate transmission related information of a data channel to the terminal, and a single-level control channel mechanism is adopted. Considering the problems in the related art that the communication signal transmission on a full system bandwidth has high complexity and low efficiency, in the embodiment of the present disclosure, it is attempted to receive a control channel on one or more control sub-bands, and both centralized transmission and discrete transmission are supported on one sub-band. However, different terminals may need different sub-band lengths and sub-band positions, one terminal may need different sub-band lengths and sub-band positions at different time points. It needs to define different sub-bands for different terminal bandwidth capabilities and different system bandwidths. Therefore, to completely solve the problems in the related art, the present embodiment provides a method for indicating the resources of communication channels and division and granularities of resources or sub-bands that are flexibly defined.

Figure 2:
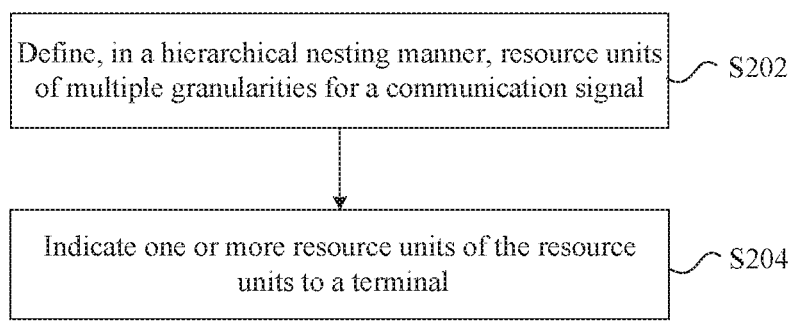
FIG. 2 is a flowchart of a resource indication method 1 according to an embodiment of the present disclosure.

This embodiment provides a resource indication method executed in the base station. FIG. 2 is a flowchart of a resource indication method 1 according to an embodiment of the present disclosure. As shown in FIG. 2, the method includes the steps described below:

In step S202, resource units of multiple granularities are defined in a hierarchical nesting manner for a communication signal. It should be noted that the term "define" as used herein may be interpreted as a division manner or a determination manner.

In step S204, one or more resource units of the resource units are indicated to the terminal.

According to the steps described above, resource units of multiple granularities are defined in a hierarchical nesting manner for a communication signal, and one or more resource units of the resource units are indicated to the terminal, so that the problem in the related art that the communication signal transmission on a full system bandwidth has high complexity and low efficiency is solved, and the purposes of flexibly defining and indicating the resources of the communication signal are realized, which is not only simple in operation, but also is beneficial to improving the transmission efficiency of communication signal.

It should be noted that the resources herein may include the time domain resources and/or frequency domain resources, and a division of the frequency domain includes a division of the sub-bands on the frequency domain. The granularity of the resource unit refers to the length or size of the resource occupied by the resource unit in the time domain or the frequency domain. For example, the frequency domain granularity refers to the number of subcarriers in the resource unit, and the time domain granularity refers to a number of symbols (for example, an Orthogonal Frequency Division Multiplexing (OFDM) symbol) in the resource unit. Alternatively, the frequency domain granularity refers to a number of Physical Resource Blocks (PRBs) in the resource unit, and the time domain granularity refers to a number of time slots in the resource unit, and the like. The communication signal may also include multiple types of signals, for example include at least one of: a control channel (signal), a data channel (signal), a demodulation reference signal, a sounding reference signal, a positioning signal (positioning reference signal), a synchronization signal (channel), a random access signal (channel), a time domain tracking reference signal and/or a frequency domain tracking reference signal, or a Radio Resource Management (RRM) measurement reference signal. Optionally, the positioning signal (positioning reference signal) is a signal or reference signal for determining or assisting in determining the orientation or position of the terminal or base station; the time domain and/or frequency domain tracking reference signal is a reference signal for measuring the time/frequency offset and assisting in correcting the time/frequency offset; and the sounding reference signal is a reference signal for a channel quality measurement, a beam measurement, or a beam tracking.

The resource unit may be a sub-band (or a PRB group) on the frequency domain, or a time unit group on the time domain. A sub-band (or a resource block group) includes one or more continuous or non-continuous PRBs on the frequency domain, and the time unit group includes one or more continuous or non-continuous time units. The time unit is a time slot, a subframe, a symbol, a frame, or a mini-slot.

The hierarchical nesting manner includes: dividing resources for transmitting the communication signal into multiple levels to obtain resource units of multiple granularities, where resource units in each level include at least one granularity of resource unit, and the multiple levels of resource units have a nested relationship. The nested relation means that resource units in a level may be divided into resource units with a smaller granularity to obtain resource units in another level.

Alternatively, the resources for transmitting the communication signal are divided into multiple levels to obtain the resource units with multiple levels in the following manner.

The resources for transmitting the communication signal are divided into N levels, and the ith ($i\in\{0\sim N-1\}$) level includes $L_i$ resource units, and the sub-band division of the N levels satisfy $L_0 \leq L_1 \leq \ldots \leq L_{N-1}$. N is an integer greater than 1, and i and $L_i$ are both nonnegative integers. Alternatively, the $L_i$ is a positive integer. It should be noted that $i\in\{0\sim N-1\}$ is only used for convenience of description of the method of the embodiment in the present disclosure and distinguishing different levels in the N-level division. In practice, the number i may be configured in other manners, such as $i\in\{1\sim N\}$.

The step of dividing resources for transmitting the communication signal into N levels includes:

When i=0, resource units in the level 0 are the frequency domain resources for transmitting the communication signal. That is, alternatively, as a preferred embodiment of the present disclosure, the level 0 (i=0) is frequency domain resources that can be used for transmitting the communication signal, $L_0=1$, and N is an integer greater than 1 and the value of Q equals to 2.

Additionally/Alternatively,

When i>0, the resource units in the ith level are obtained by the following manner: dividing the resource units of the (i−1)th level into Q resource units with a smaller granularity, and Q is an integer greater than 1 and satisfies the following relationship $L_{i+1}=L_i \times Q$.

Alternatively, when i>0, any two resource units at the ith level have the same granularity. That is, each resource unit of (i−1)th level is equally divided into Q resource units with a smaller granularity.

Alternatively, any two resource units at the same level have the same granularity, that is, each level only has resource units with one granularity.

Alternatively, the resources which may be used for transmitting the communication signal are frequency domain resources corresponding to the system bandwidth, frequency domain resources supported by the terminal, specified frequency domain resources in the frequency domain resources corresponding to the system bandwidth, and specified frequency domain resources in the frequency domain resources supported by the terminal. Alternatively, the frequency domain resources supported by the terminal is frequency domain resources corresponding to a maximum bandwidth supported by the terminal.

Alternatively, the resources available for transmitting the communication signal is a time period of a specified length in the time domain, the time period of the specified length includes a specified number of time units, and the time unit may be a slot, a subframe, a frame, a symbol, or a mini-slot.

Before one or more of the resource units are indicated to the terminal, the resource units of multiple granularities may be numbered according to a predefined method. In an alternative embodiment, the number may be a binary integer or a non-negative integer. For example, at least one of the following manners can be employed:

In the predefined method, according to a largest-to-smallest order or a smallest-to-largest order of the granularities of the resource units, or according to a highest-to-lowest order or a lowest-to-highest order or a center-to-edge order of frequency domains of the resource units, the resource units are numbered from a smallest number to a largest number. The value of the number is a non-negative integer. Optionally, the minimum value of the number is 0.

For example, the predefined manner includes at least one of: according to a largest-to-smallest order or a smallest-to-largest order of the granularities of the resource units, numbering the resource units from a smallest number to a largest number; according to a largest-to-smallest order or a smallest-to-largest order of hierarchical indexes of the resource units, numbering the resource units from a smallest number to a largest number; according to a highest-to-lowest order or a lowest-to-highest order or a center-to-edge order of frequency domains of the resource units, numbering the resource units from a smallest number to a largest number; or according to a front-to-end order or an end-to-front order of time domains of the resource units, numbering the resource units from a smallest number to a largest number.

Alternatively, the predefined method is that for resource units of any granularity, sequentially numbering the resource units from a smallest number to a largest number or from a largest number to a smallest number according to a highest-to-lowest order or a lowest-to-highest order or a center-to-edge order of frequency domains of the resource units. The value of the number is a non-negative integer. Optionally, the minimum value of the number is 0.

For example, the predefined method may include at least one of: respectively numbering resource units in the same level or numbering resource units with the same resource granularity according to at least one of the following manners: numbering the resource units from a smallest number to a largest number according to a highest-to-lowest order or a lowest-to-highest order or a center-to-edge order of frequency domains of the resource units; or numbering the resource units from a smallest number to a largest number according to a front-to-end order or an end-to-front order of time domains of the resource units.

Alternatively, the predefined method is as follows. Any resource unit in the (i−1)th level (i>0) corresponds to Q resource units in the ith level, the Q resource units have a same resource position as the resource unit in the (i−1)th level and have a smaller granularity than the resource unit in the (i−1)th level. The Q resource units in the ith level are numbered from a smallest number to a largest number or from a largest number to a smallest number according to a highest-to-lowest order or a lowest-to-highest order or a center-to-edge order of frequency domains of the Q resource units. The value of the number is a non-negative integer or a binary integer.

For example, one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, are numbered in at least one of the following manners: numbering the one or more resource units with a smaller granularity from a smallest number to a largest number according to a highest-to-lowest order or a lowest-to-highest order or a center-to-edge order of frequency domains of the one or more resource units; or numbering the one or more resource units with a smaller granularity from a smallest number to a largest number according to a front-to-end order or an end-to-front order of time domains of the one or more resource units.

The predefined method further includes: resource units whose frequency domains are closely adjacent to a center frequency have a same number; or resource units whose frequency domains have the same distance from the center frequency domain have the same number.

Additionally, one or more of the resource units may be indicated to the terminal in multiple manners, for example, one or more of the resource units may be indicated to the terminal in at least one of the following manners.

One or more of the resource units are indicated to the terminal by indicating one or more numbers to the terminal, and one number corresponds to one or more resource units. Examples are described below.

In the manner 1: one or more of the resource units are indicated to the terminal by indicating one number to the terminal, that is, indicating one or more of the resource units to the terminal is achieved by indicating one of the numbers to the terminal, and one number corresponds to one or more resource units.

In the manner 2: one or more of the resource units are indicated to the terminal by indicating one or more numbers to the terminal, that is, indicating one or more of the resource units to the terminal is achieved by indicating one or more of the numbers to the terminal, and one number corresponds to one resource unit; different numbers correspond to different resource units.

In the manner 3: one or more of the resource units are indicated to the terminal by indicating one or more numbers to the terminal, that is, indicating one or more of the resource units to the terminal is achieved by indicating one or more of the numbers to the terminal, and one number corresponds to one or more resource units.

Alternatively, one or more of the resource units may also be indicated to the terminal via one or more sets of signaling, and one set of signaling is used for indicating one number.

Alternatively, resource unit granularity information (e.g., equally dividing each sub-band of level 1 into 3 smaller sub-bands, and the 3 is the granularity of division) in the hierarchical nesting manner and/or the number of levels corresponding to the hierarchical nesting manner is indicated to the terminal by at least one of the following manners: indicating according to a system bandwidth, where the system bandwidth has a predefined corresponding relation with the hierarchical nesting manner; indicating by a broadcast channel; or indicating by a synchronization channel (synchronization signal). It should be noted that the step of indicating the resource unit granularity information in the hierarchical nesting manner and/or the number of levels corresponding to the hierarchical nesting manner to the terminal may be after the step of defining the resource units of multiple granularities for the communication signal in the hierarchical nesting manner, or may be before the step of defining the resource units of multiple granularities for the communication signal in the hierarchical nesting manner, which are not limited herein.

It should be noted that the above-mentioned information may also be appointed in advance by the base station and the terminal.

Alternatively, in the method, one or more of the resource units may be indicated to the terminal via multiple levels of signaling. The multiple levels of signaling are respectively used for indicating the resource units of at least one granularity among the resource units of multiple granularities. Alternatively, the granularity of the resource unit indicated by the latter level of signaling is smaller than the granularity of the resource unit indicated by the former level of signaling. For example, the multiple levels of signaling may include different types of signaling, or carried in different types of physical channels, or carried by different time intervals of the same type of physical channel. Alternatively, in the time domain, the latter level of signaling occurs after the former level of signaling. Alternatively, the multiple levels of signaling are physical control signaling carried by multiple levels of physical control channels. Alternatively, the multiple types of signaling forming the multiple levels of signaling may include at least one of higher layer signaling, physical layer control signaling, Media Access Control (MAC) signaling, or broadcast signaling.

Alternatively, the resource units of multiple granularities have a same subcarrier spacing; and/or, the resource units of multiple granularities have a same symbol length and cyclic shift length.

Alternatively, the resources for transmitting the communication signal include multiple types of resources. For example, the resources may include at least one of: frequency domain resources corresponding to the system bandwidth, frequency domain resources supported by the terminal, frequency domain resources specified in the frequency domain resources corresponding to the system bandwidth, and frequency domain resources specified in the frequency domain resources supported by the terminal.

It should be noted that the term "predefined" or "predefine" used in the description of the embodiments of the present disclosure, unless otherwise explained, means that the object described by "predefined" or "predefine" is known to both the base station and the terminal, or may be agreed in advance by the base station and the terminal, or indicated to the terminal by the base station. The term "specific" or "specified" used in the description in the embodiments of the present disclosure, unless otherwise explained, means that the object described by "specific" or "specified" is known to both the base station and the terminal, or may be agreed in advance by the base station and the terminal, or indicated to the terminal by the base station.

Figure 3:
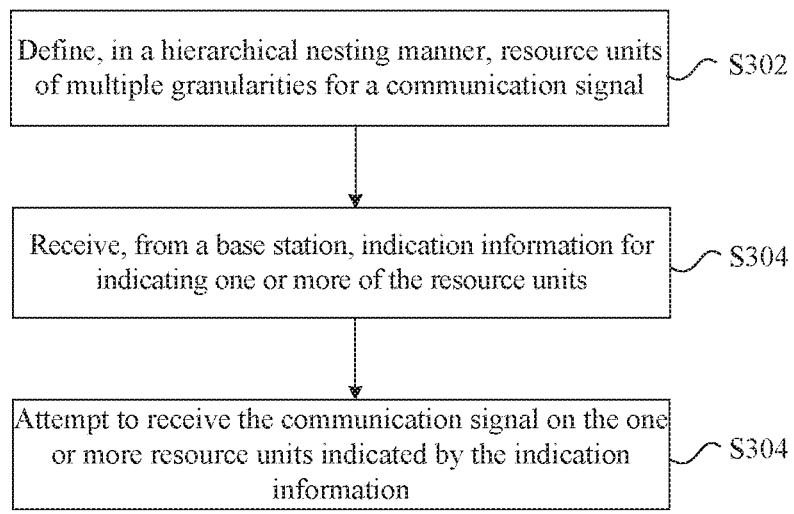
FIG. 3 is a flowchart of a resource indication method 2 according to an embodiment of the present disclosure.

FIG. 3 is a flowchart of a resource indication method 2 provided by an embodiment of the present disclosure. As shown in FIG. 3, the method includes the steps described below:

In step S302, resource units of multiple granularities are defined in a hierarchical nested manner for a communication signal.

In step S304, an indication information employed by the base station for indicating one or more of the resource units is received.

In step S304, it is attempted to receive the communication signal on the one or more resource units indicated by the indication information.

According to the steps described above, resource units of multiple granularities are defined in a hierarchical nesting manner for a communication signal, and after the indication information for indicating the resource units is received, it is attempted to receive the communication signal according to the resource units indicated by the indication information. The problem in the related art that the communication signal transmission on a full system bandwidth has high complexity and low efficiency is solved, and the purpose of flexibly defining and indicating the resources of the communication signal is realized. The present disclosure is not only easy to operate, but also is favorable to improving the transmission efficiency of communication signal.

Alternatively, the communication signal includes at least one of: a control signal, a data signal, a demodulation reference signal, a sounding reference signal, a positioning signal, a synchronization signal, a random access signal, a time domain tracking reference signal and/or a frequency domain tracking reference signal, or a radio resource management measurement reference signal.

Alternatively, the resource units may include multiple types, for example, may include at least one of: a sub-band in a frequency domain or a time unit group in a time domain. The sub-band includes one or more physical resource blocks in the frequency domain. The time unit group includes one or more time units, and the time unit includes one of: a slot, a subframe, a symbol, a frame, or a mini-slot.

Alternatively, defining in a hierarchical nesting manner the resource units of multiple granularities for a communication signal includes: dividing the resources for transmitting the communication signal into multiple levels to obtain multiple levels of resource units, where each level of resource units include at least one granularity of resource units and the multiple levels of resource units have a nested relationship.

Alternatively, dividing the resources for transmitting the communication signal into multiple levels to obtain multiple levels of resource units includes: dividing the resources for transmitting the communication signal into N levels, where the resources are divided into $L_i$ resource units in the ith level, and N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers. It should be noted that $i \in \{0 \sim N-1\}$ is only used for convenience of description of the method of the embodiment in the present disclosure and distinguishing different levels in the N-layer division, and in practice, the number i may be arranged in other manners, such as $i \in \{1 \sim N\}$.

Dividing the resources for transmitting the communication signal into N levels includes: when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{1+1}=L_i \times Q$.

Any two resource units at the same level have the same granularity.

After the resource units of multiple granularities are defined in the hierarchical nesting manner for the communication signal, the resource units of multiple granularities may be numbered in a predefined manner.

The predefined manner used for numbering the resource units of multiple granularities may adopt multiple manners, for example, one of the following manners may be adopted.

According to a largest-to-smallest order or a smallest-to-largest order of the granularities of the resource units, the resource units are numbered form a smallest number to a largest number.

According to a largest-to-smallest order or a smallest-to-largest order of hierarchical indexes of the resource units, the resource units are numbered form a smallest number to a largest number.

According to a highest-to-lowest order or a lowest-to-highest order or a center-to-edge order of frequency domains of the resource units, the resource units are numbered form a smallest number to a largest number.

According to a front-to-end order or an end-to-front order of time domains of the resource units, the resource units are numbered form a smallest number to a largest number.

Alternatively, the process of numbering the resource units of multiple granularities in the predefined manner includes the following steps.

The resource units of the same level or the same resource granularity are respectively numbered according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

The process of numbering the resource units of multiple granularities in the predefined manner includes the following steps.

One or more resource units in the ith level corresponding to a resource unit in (i−1)th level are respectively numbered in at least one of the following manners, where the one or more resource units in the ith level have a same resource position as the resource unit in (i−1)th level and have a smaller granularity than the resource unit in (i−1)th level, where i>0.

The one or more resource units with a smaller granularity are numbered from a smallest number to a largest number according to a highest-to-lowest order or a lowest-to-highest order or a center-to-edge order of frequency domains of the one or more resource units; or, the one or more resource units with a smaller granularity numbered from a smallest number to a largest number according to a front-to-end order or an end-to-front order of time domains of the one or more resource units. The number is a non-negative integer or a binary integer.

The numbering the resource units with the multiple granularities in the predefined manner includes: numbering resource units whose frequency domains are closely adjacent to a center frequency with a same number; or numbering resource units whose frequency domains have the same distance from the center frequency domain with the same number.

Alternatively, the indication information through which the base station indicates one or more of the resource units is received by receiving one or more numbers indicated by the base station, where one number corresponds to one or more resource units.

For example, the indication information through which the base station indicates one or more of the resource units may be received in one of the following manners.

The indication information through which the base station indicates one or more of the resource units is received by receiving one number indicated by the base station, where the one number corresponds to the one or more resource units. The indication information through which the base station indicates one or more of the resource units is received by receiving one or more numbers indicated by the base station, where one number corresponds to one resource unit, and different numbers correspond to different resource units.

The method described above further includes: receiving the indication information through which the base station indicates one or more of the resource units in the following manners: receiving the indication information through which the base station indicates one or more of the resource units via one or more sets of signaling, where one set of signaling is configured for indicating one number.

Alternatively, before dividing in the hierarchical nesting manner the resources for transmitting the communication signal into resource units based on multiple granularities, the method further includes acquiring resource unit granularity information of the hierarchical nesting manner and/or a number of levels corresponding to the hierarchical nesting manner. The resource unit granularity information of the hierarchical nesting manner and/or the number of levels corresponding to the hierarchical nesting manner may be acquired in multiple manners, for example, the resource unit granularity information of the hierarchical nesting manner and/or the number of levels corresponding to the hierarchical nesting manner may be acquired in at least one of the following manners: the resource unit granularity information of the hierarchical nesting manner and/or the number of levels corresponding to the hierarchical nesting manner is acquired according to a system bandwidth, where the system bandwidth has a predefined corresponding relation with the hierarchical nesting manner; the resource unit granularity information of the hierarchical nesting manner and/or the number of levels corresponding to the hierarchical nesting manner is acquired by an indication of a broadcast channel; or the resource unit granularity information of the hierarchical nesting manner and/or the number of levels corresponding to the hierarchical nesting manner is acquired by an indication of a synchronization signal.

The indication information through which the base station indicates one or more of the resource units may be received in the following manner: receiving the indication information through which the base station indicates one or more of the resource units by receiving multiple levels of signaling, where each of the multiple levels of signaling is configured for indicating at least one granularity of resource units among the resource units of multiple granularities. Alternatively, the granularity of the resource unit indicated by the latter level of signaling is smaller than the granularity of the resource unit indicated by the former level of signaling.

Alternatively, the multiple levels of signaling is physical control signaling carried by multiple levels of physical control channels; or the multiple levels of signaling at least include higher layer signaling and physical layer control signaling.

Alternatively, the resource units of multiple granularities have a same subcarrier spacing; and/or, the resource units of multiple granularities have a same symbol length and cyclic shift length.

It should be noted that the resources used for transmitting the communication signal include one of: frequency domain resources corresponding to the system bandwidth, frequency domain resources supported by the terminal, specified frequency domain resources in the frequency domain resources corresponding to the system bandwidth, and specified frequency domain resources in the frequency domain resources supported by the terminal. Alternatively, the frequency domain resources supported by the terminal are frequency domain resources corresponding to a maximum bandwidth supported by the terminal.

By adopting the resource definition and indication method for the communication signal provided by the above embodiments, the resource units of multiple granularities are defined in the hierarchical nesting manner for the communication signal, and the resource units of multiple granularities are numbered according to the predefined method. The numbers are indicated to the terminal via one or more sets of signaling (multiple levels of signaling). In addition, different hierarchical nesting manners may be defined for different system bandwidths and different terminal bandwidths. The purpose of flexibly defining and indicating the resources of the communication signal is effectively realized.

Description will be made below in conjunction with the specified and preferred embodiments.

Preferred Embodiment 1

Division and indication of sub-bands for the control channel.

Figure 4:
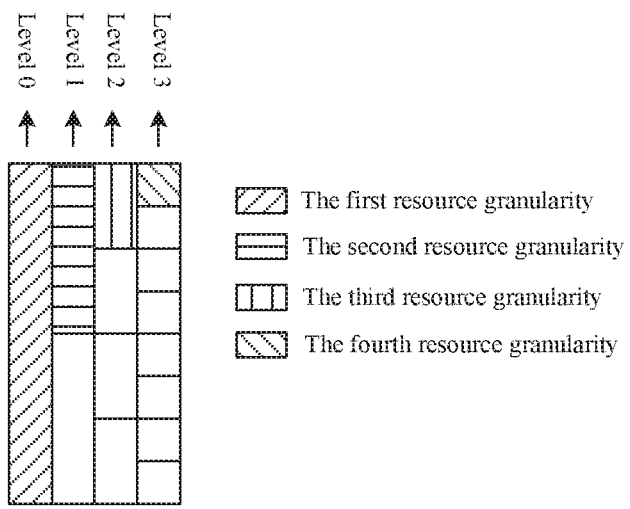
FIG. 4 is a schematic diagram of resource units of multiple granularities defined in a hierarchical nesting manner according to a preferred embodiment of the present disclosure.

The sub-bands of multiple granularities (lengths) are defined in the following hierarchical nesting manner for the control channel, and the hierarchical nesting manner of the resource definition is defined in advance by the base station and the terminal:

FIG. 4 is a schematic diagram of resource units of multiple granularities defined in a hierarchical nesting manner according to a preferred embodiment of the present disclosure. As shown in FIG. 4, the 0th level is a system bandwidth (a first sub-band), and the resource granularity of the first sub-band is a first resource granularity (a first sub-band length). The first level is divided based on the resource granularity of the 0th level. As shown in FIG. 4, each sub-band in the 0th level is divided into two smaller sub-bands (second sub-band), and the resource granularity corresponding to the first level is the second resource granularity (a length of the second sub-band). The second level is divided based on the resource granularity of the first level. As shown in FIG. 4, each sub-band of the first level is divided into two smaller sub-bands (third sub-band), and the resource granularity corresponding to the second level is the third resource granularity (a length of the third sub-band). The third level is divided based on the resource granularity of the second level. As shown in FIG. 4, each sub-band of the second level is divided into 2 smaller sub-bands (fourth sub-band), and the resource granularity corresponding to the third level is the fourth resource granularity (a length of the fourth sub-band).

Figure 5:
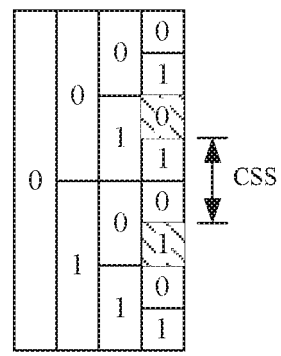
FIG. 5 is a schematic diagram of numbering, in a predefined manner 1, resource units of multiple granularities defined in the hierarchical nesting manner according to a preferred embodiment of the present disclosure.

The sub-bands of multiple granularities are numbered according to one of the following predefined methods, and one or more numbers are notified to the terminal so as to achieve the purpose of indicating one or more sub-band resources to the terminal:

Manner 1:

FIG. 5 is a schematic diagram of numbering resource units of multiple granularities defined in the hierarchical nesting manner according to the predefined method 1. As shown in FIG. 5, the sub-bands are each numbered with a binary number starting from the sub-band of the 0th level, and two sub-bands from the same parent sub-band are numbered with different binary values. If the current transmission of the control channel supports the 4-level resource granularity definition, the resource position of any sub-band of the third level can be indicated by 4-bit signaling. If the current transmission of the control channel supports the 3-level resource granularity definition, the resource position of any sub-band of the second level can be indicated by 3-bit signaling, and so on. The level quantity in the resource granularity definition supported by the control channel can be fixed, i.e. the level quantity is defined by the base station and the terminal in advance, or the base station indicates the level quantity to the terminal via signaling. The resource positions of multiple sub-bands may be indicated to the terminal via multiple sets of signaling. For example, the control channel supports the 4-level resource granularity definition, the resource positions of any two sub-bands on the third level frequency domain resource may be informed by two 4-bit signaling. For example, two sub-bands as indicated by horizontal lines in the figure on the third level may be indicated to the terminal by signaling "0010 (bit sequence)" and signaling "0101 (bit sequence)". The bit sequence values from left to right sequentially correspond to the binary numbers of the corresponding sub-bands from the 0th level to the third level. The sub-band in the third level whose sub-band numbers from the 0th level to the third level are 0011 and the sub-band in the third level whose sub-band numbers from the 0th level to the third level are 0100 may be set as a Common Search Space (CSS) of a common control channel. The CSS may be defined in advance or informed to the terminal by two sets of signaling.

Figure 6:
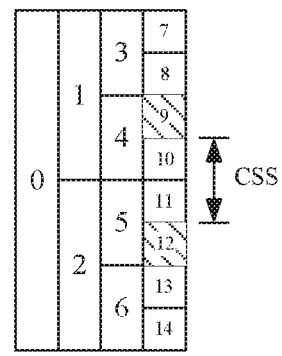
FIG. 6 is a schematic diagram of numbering, in a predefined manner 2, resource units of multiple granularities defined in the hierarchical nesting manner according to an embodiment of the present disclosure.

Manner 2:

FIG. 6 is a schematic diagram of numbering, according to the predefined method 2, resource units of multiple granularities defined in the hierarchical nesting manner according to an embodiment of the present disclosure. As shown in FIG. 6, the sub-bands of all granularities are numbered sequentially from 0th level to the third level and from lower frequency to higher frequency in the frequency domain. The sub-band number is a non-negative integer, and starts from 0 and increases sequentially. Different sub-bands are numbered with different numbers. Assuming that the maximum number is N1, the resource position of any one of the sub-bands from the 0th level to the third level may be indicated by $\lceil \log_2 N1 \rceil$-bit signaling. Resource positions of multiple sub-bands may also be indicated to the terminal by multiple sets of signaling. For example, the resource positions of the sub-band whose number is 9 and the sub-band whose number is 12 may be indicated to the terminal by two sets of signaling. The bit sequence corresponding to one signaling is 1000 (the binary sequence represents a decimal number whose value is 9), and the bit sequence corresponding to the other signaling is 1100 (the binary sequence represents a decimal number whose value is 12). The sub-band with the number 10 and the sub-band with the number 11 may be set as the CSS of a common control channel. The CSS may be defined in advance or informed to the terminal by two sets of signaling.

Figure 7:
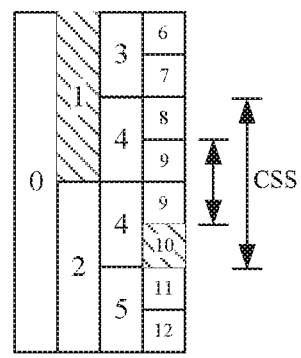
FIG. 7 is a schematic diagram of numbering, in a predefined manner 3, resource units of multiple granularities defined in the hierarchical nesting manner according to a preferred embodiment of the present disclosure.

Manner 3:

FIG. 7 is a schematic diagram of numbering, according to the predefined method 3, resource units of multiple granularities defined in the hierarchical nesting manner according to a preferred embodiment of the present disclosure. As shown in FIG. 7, the sub-bands of all granularities are numbered sequentially from 0th level to the third level and from lower frequency to higher frequency in the frequency domain. The sub-band number is a non-negative integer, and starts from 0 and increases sequentially. The upper-level sub-band and the lower-level sub-band closely adjacent to the center frequency of the 0th level or a system frequency center frequency are numbered with a same sub-band number. Assuming that the maximum sub-band number is N2, the sub-band resource position corresponding to any number from the 0th level to the third level may be indicated by the $[\log_2 N2]$-bit signaling. For example, the sub-band whose sub-band number is 1 and the sub-band whose sub-band number is 10 may be indicated to the terminal by two sets of signaling. One signaling corresponds to a bit sequence 0001 (this binary sequence represents a decimal value 1), and the other signaling corresponds to a bit sequence 1010 (this binary sequence represents a decimal value 10). Two sub-bands corresponding to the number 4 or two sub-bands corresponding to the number 9 may be set as the CSS of a common control channel. The CSS may be defined in advance or informed to the terminal by one set of signaling.

After receiving the indication information of the resource positions of one or more sub-bands, the terminal tries to receive the control channel at these resource positions.

It should be noted that the above sub-band definition and indication methods are also applicable to demodulation reference signals associated with the control channel.

As still another implementation of the embodiments of the present disclosure, the sub-band definition and indication methods are also applicable to the data channel and demodulation reference signal thereof.

As still another implementation of the embodiments of the present disclosure, the sub-band definition and indication methods are also applicable to other signals or channels, for example, the sounding reference signal (SRS).

Preferred Embodiment 2

Division for the data channel and indication of resources for the data channel by multiple levels of control channels The sub-bands of multiple granularities are defined in a hierarchical nesting manner for the data channel. The resource positions of one or more sub-bands are indicated to the terminal via a first-level control channel, and physical resource blocks (PRBs) within the one or more sub-bands and used for current data channel transmission are indicated to the terminal via a second-level control channel. The method for indicating a specific PRB position to the terminal via the second-level control channel may refer to a resource indication type 0, a resource indication type 1, and a resource indication type 2 in LTE.

As still another implementation of the preferred embodiment of the present disclosure, the resources of the data channel are defined in the hierarchical manner. Each level is defined in the hierarchical nesting manner, and the second level is defined based on a resource selected from the resources defined in the first level. For example, the sub-bands of multiple granularities are defined in the hierarchical nesting manner for the data channel, and one or more sub-bands are indicated to the terminal via the first-level control channel, further, frequency domain resource units of multiple granularities are defined in the hierarchical nesting manner based on the one or more sub-band resources for the data channel. One or more frequency domain resource units of multiple granularities are indicated to the terminal via the second-level control channel. The frequency domain resource unit may be a PRB or a PRB Group (PRG), and the PRG includes one or more PRBs whose frequency domain positions are continuous or numbered continuously. Specific hierarchical nesting manner and indication methods can refer to the method described in the preferred Embodiment 1. Alternatively, the hierarchical nesting manner for defining the sub-bands and the frequency domain resource units is agreed in advance by the base station and the terminal, and different hierarchical nesting manners can be defined for different system bandwidths and different sub-band lengths (lengths of one or more sub-bands).

From the description of the embodiments described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and the storage medium includes several instructions for enabling a terminal device (which may be a mobile phone, a computer, a server, a network device, or the like) to perform the method according to each embodiment of the present disclosure.

Embodiment 2

The present embodiment further provides a resource indication device, configured to implement the above-mentioned embodiments and preferred implementation modes. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 8:
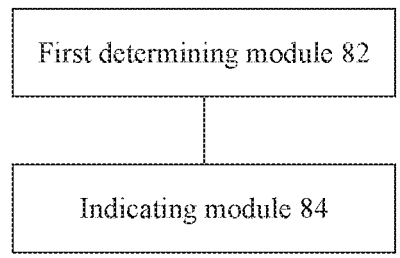
FIG. 8 is a structural block diagram of a first resource indication device according to an embodiment of the present disclosure.

FIG. 8 is a structural block diagram of a first resource indication device according to an embodiment of the present disclosure. As shown in FIG. 8, the device includes a first determining module 82 and an indicating module 84. The device is described below.

The first determining module 82 is configured to define resource units of multiple granularities for a communication signal in the hierarchical nesting manner. The indicating module 84 is connected to the first determining module 82 and configured to indicate one or more of the resource units to the terminal.

Alternatively, the above-mentioned communication signal includes at least one of: a control signal, a data signal, a demodulation reference signal, a sounding reference signal, a positioning signal, a synchronization signal, a random access signal, a time domain tracking reference signal and/or frequency domain tracking reference signal, or a radio resource management measurement reference signal.

Alternatively, the resource unit includes at least one of: a sub-band in a frequency domain or a time unit group in a time domain. The sub-band includes one or more physical resource blocks in the frequency domain. The time unit group includes one or more time units, and the time unit includes one of: a slot, a subframe, a symbol, a frame, or a mini-slot.

Figure 9:
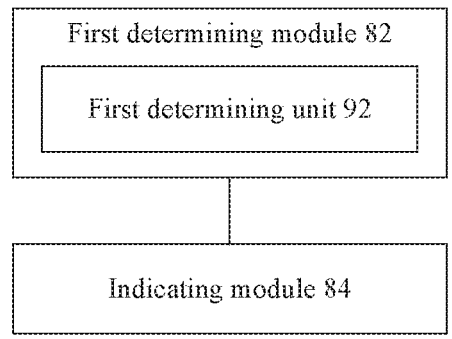
FIG. 9 is a preferred structural block diagram of a first determining module 82 in the first resource indication device according to an embodiment of the present disclosure.

FIG. 9 is a block diagram of a preferred structure of the first determining module 82 in the first resource indication device according to an embodiment of the present disclosure. As shown in FIG. 9, the first determining module 82 includes: a first determining unit 92, which will be described below.

The first determining unit 92 is configured to divide resources for transmitting the communication signal into multiple levels to obtain multiple levels of resource units, and each level of resource units include at least one granularity of resource units, and the multiple levels of resource units have a nested relationship.

Alternatively, the first determining unit 92 described above is further configured to divide the resources for transmitting the communication signal into N levels, where the resources are divided into $L_i$ resource units in the ith level, and the N levels of resource units satisfy $L_0 \le L_1 \le \ldots \le L_{N-1}$, where $i \in \{0 \sim N-1\}$, N is an integer greater than 1, and i and $L_i$ are both nonnegative integers.

Alternatively, the first determining unit is further configured as follows:

when i=0, resource units in the 0th level are frequency domain resources for transmitting the communication signal; and/or, when i>0, resource units in the ith level are obtained by dividing each resource unit in the (i−1)th level into Q resource units with a smaller granularity, where Q is an integer greater than 1 and satisfies the following relationship $L_{i+1} = L_i \times Q$.

Alternatively, any two resource units at the same level may have the same granularity.

Figure 10:
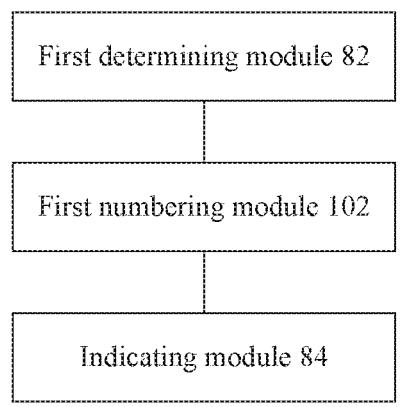
FIG. 10 is a preferred structural block diagram of the first resource indication device according to an embodiment of the present disclosure.

FIG. 10 is a block diagram of a preferred structure of the first resource indication device according to an embodiment of the present disclosure. As shown in FIG. 10, in addition to the structure as shown in FIG. 8, the device further includes: a first numbering module 102, which will be described below.

The first numbering module 102 is connected to the above first determining module 82 and the indicating module 84 and configured to number the resource units of multiple granularities in a predefined manner.

The predefined manner with which the first numbering module 102 numbers the resource units of multiple granularities may include multiple manners, for example, include at least one of the following manners: numbering the resource units from a smallest number to a largest number according to a largest-to-smallest order or a smallest-to-largest order of the granularities of the resource units; numbering the resource units from a smallest number to a largest number according to a largest-to-smallest order or a smallest-to-largest order of hierarchical indexes of the resource units; numbering the resource units from a smallest number to a largest number according to a highest-to-lowest order or a lowest-to-highest order or a center-to-edge order of frequency domains of the resource units; or numbering the resource units from a smallest number to a largest number according to a front-to-end order or an end-to-front order of time domains of the resource units.

When numbering the resource units of multiple granularities in the predefined manner, the first numbering module 102 may be further configured to: respectively number resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

When numbering the resource units of multiple granularities in the predefined manner, the first numbering module 102 may further be configured to respectively number one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: numbering the one or more resource units with a smaller granularity from a smallest number to a largest number according to a highest-to-lowest order or a lowest-to-highest order or a center-to-edge order of frequency domains of the one or more resource units; or, numbering the one or more resource units with a smaller granularity from a smallest number to a largest number according to a front-to-end order or an end-to-front order of time domains of the one or more resource units.

When numbering the resource units of multiple granularities in the predefined manner, the first numbering module 102 may further be configured to: number resource units whose frequency domains are closely adjacent to a center frequency with a same number; or number resource units whose frequency domains have the same distance from the center frequency domain with the same number.

The above indicating module 84 may indicate one or more of the resource units to the terminal in multiple manners, for example: the indicating module 84 indicates one or more of the resource units to the terminal by indicating one or more numbers to the terminal, where one number corresponds to one or more resource units. Alternatively, the indicating module 84 indicates one or more of the resource units to the terminal via one or more signaling, and one signaling indicates one number.

In addition, the indicating module 84 may further indicate resource unit granularity information in the hierarchical nesting manner and/or a number of levels corresponding to the hierarchical nesting manner to the terminal. The indicating module 84 may adopt multiple manners to indicate the resource unit granularity information in the hierarchical nesting manner and/or the number of levels corresponding to the hierarchical nesting manner to the terminal. For example, the indicating module 84 indicates the resource unit granularity information in the hierarchical nesting manner and/or the number of levels corresponding to the hierarchical nesting manner to the terminal by at least one of the following manners: indicating the resource unit granularity information in the hierarchical nesting manner and/or the number of levels corresponding to the hierarchical nesting manner according to the system bandwidth, where the system bandwidth has a predefined corresponding relation with the hierarchical nesting manner; indicating the resource unit granularity information in the hierarchical nesting manner and/or the number of levels corresponding to the hierarchical nesting manner by a broadcast channel; or indicating the resource unit granularity information in the hierarchical nesting manner and/or the number of levels corresponding to the hierarchical nesting manner by a synchronization signal.

The indicating module 84 is further configured to indicate one or more of the resource units to the terminal via multiple levels of signaling, and each the multiple levels of signaling is used for indicating at least one granularity of resource units among the resource units of multiple granularities. The multiple levels of signaling include physical control signaling carried by multiple levels of physical control channels; or, the multiple levels of signaling at least include higher layer signaling and physical layer control signaling.

Alternatively, the resource units of multiple granularities have a same subcarrier spacing; and/or, the resource units of multiple granularities have a same symbol length and cyclic shift length.

Alternatively, frequency domain resources corresponding to the system bandwidth, frequency domain resources supported by the terminal, frequency domain resources specified in the frequency domain resources corresponding to the system bandwidth, and frequency domain resources specified in the frequency domain resources supported by the terminal.

Figure 11:
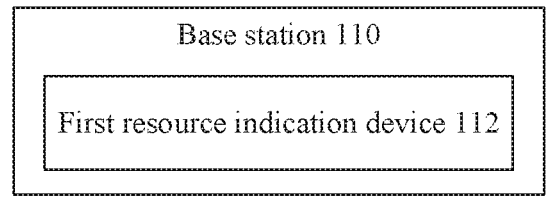
FIG. 11 is a structural block diagram of a base station according to an embodiment of the present disclosure.

FIG. 11 is a structural block diagram of a base station according to an embodiment of the present disclosure. As shown in FIG. 11, the base station 110 includes any one of the first resource indication devices 112 described above.

Figure 12:
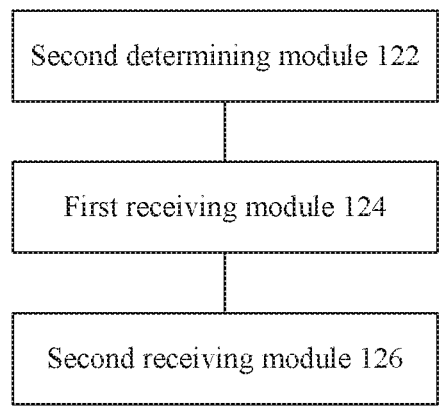
FIG. 12 is a structural block diagram of a second resource indication device according to an embodiment of the present disclosure.

FIG. 12 is a structural block diagram of a second resource indication device according to an embodiment of the present disclosure. As shown in FIG. 12, the device includes a second determining module 122, a first receiving module 124 and a second receiving module 126. The device is described below.

The second determining module 122 is configured to define resource units of multiple granularities in a hierarchical nesting manner for a communication signal. The first receiving module 124 is connected to the second determining module 122 and configured to receive indication information from the base station, where the indication information indicates one or more of the resource units. The second receiving module 126 is connected to the first receiving module 124 and configured to attempt to receive the communication signal on the one or more resource units indicated by the indication information.

Alternatively, the above communication signal includes at least one of: a control signal, a data signal, a demodulation reference signal, a sounding reference signal, a positioning signal, a synchronization signal, a random access signal, a time and/or frequency domain tracking reference signal, or a radio resource management measurement reference signal.

Alternatively, the resource unit includes at least one of: a sub-band in a frequency domain or a time unit group in a time domain. The sub-band includes one or more physical resource blocks in the frequency domain. The time unit group includes one or more time units, and the time unit includes one of: a slot, a subframe, a symbol, a frame, or a mini-slot.

Figure 13:
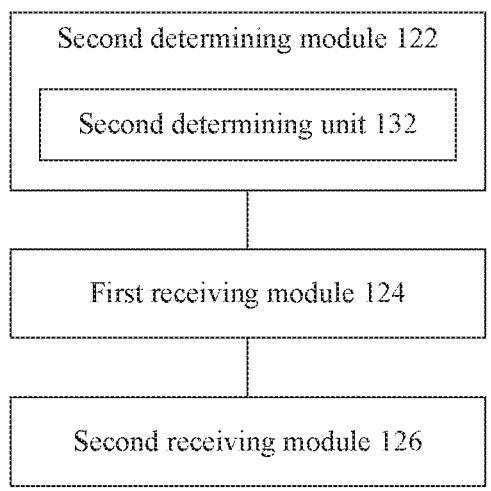
FIG. 13 is a preferred structural block diagram of a second determining module 122 in the second resource indication device according to an embodiment of the present disclosure.

FIG. 13 is a block diagram of a preferred structure of the second determining module 122 in the second resource indication device according to an embodiment of the present disclosure. As shown in FIG. 13, the second determining module 122 includes: a second determining unit 132, which will be described below.

The second determining unit 132 is configured to divide resources for receiving the communication signal into multiple levels to obtain multiple levels of resource units. Each level of resource units include at least one granularity of resource units, and the multiple levels of resource units have a nested relationship.

Alternatively, the second determining unit 132 is further configured to divide the resources for receiving the communication signal into N levels, where an ith level includes $L_i$ resource units, the N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers.

Alternatively, the second determining unit 132 is further configured to:

when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1} = L_i \times Q$.

Alternatively, any two resource units at the same level have the same granularity.

Figure 14:
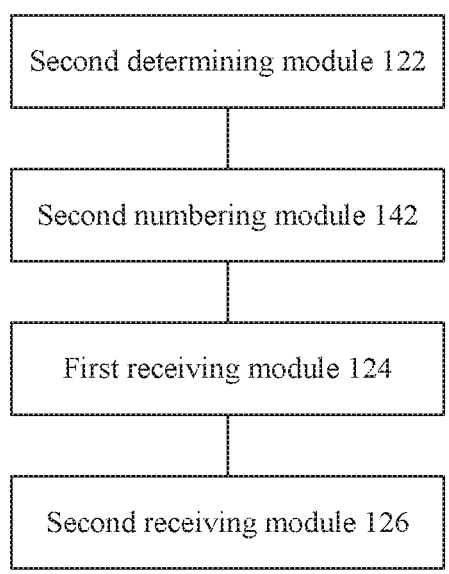
FIG. 14 is a preferred structural block diagram of the second resource indication device according to an embodiment of the present disclosure.

FIG. 14 is a block diagram of a preferred structure of the second resource indication device according to an embodiment of the present disclosure. As shown in FIG. 14, in addition to the structure as shown in FIG. 12, the device further includes: a second numbering module 142, which will be described below.

The second numbering module 142 is connected to the second determining module 122 and configured to number the resource units of multiple granularities in a predefined manner.

Alternatively, the predefined manner using which the second numbering module 142 numbers the resource units of multiple granularities may include multiple manners, for example, the second numbering module 142 numbers the resource units of multiple granularities in at least one of the following manners: numbering the resource units from a smallest number to a largest number according to a largest-to-smallest order or a smallest-to-largest order of the granularities of the resource units; numbering the resource units from a smallest number to a largest number according to a largest-to-smallest order or a smallest-to-largest order of hierarchical indexes of the resource units; numbering the resource units from a smallest number to a largest number according to a highest-to-lowest order or a lowest-to-highest order or a center-to-edge order of frequency domains of the resource units; or numbering the resource units from a smallest number to a largest number according to a front-to-end order or an end-to-front order of time domains of the resource units.

Alternatively, the second numbering module 142 is further configured to respectively number resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, the second numbering module 142 is further configured to:

respectively number one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners:

according to a highest-to-lowest order or a lowest-to-highest order or a center-to-edge order of frequency domains of the one or more resource units, the second numbering module 142 numbers the one or more resource units with a smaller granularity from a smallest number to a largest number; or according to a front-to-end order or an end-to-front order of time domains of the one or more resource units, the second numbering module 142 numbers the one or more resource units with a smaller granularity from a smallest number to a largest number.

Alternatively, the second numbering module 142 is further configured to number resource units whose frequency domains are closely adjacent to a center frequency with a same number; or number resource units whose frequency domains have the same distance from the center frequency domain with the same number.

Alternatively, the first receiving module is further configured to receive from the base station indication information indicating one or more of the resource units by receiving one or more numbers indicated by the base station, where one number corresponds to one or more resource units.

Alternatively, the first receiving module is further configured to receive from the base station indication information indicating one or more of the resource units via one or more sets of signaling, where one set of signaling indicates one number.

Alternatively, before defining the resource units of multiple granularities in the hierarchical nesting manner for the communication signal, the first receiving module is further configured to: acquire resource unit granularity information of the hierarchical nesting manner and/or a number of levels corresponding to the hierarchical nesting manner.

The first receiving module may acquire the resource unit granularity information of the hierarchical nesting manner and/or the number of levels corresponding to the hierarchical nesting manner in multiple manners. For example, the first receiving module may acquire the resource unit granularity information of the hierarchical nesting manner and/or the number of levels corresponding to the hierarchical nesting manner in at least one of the following manners: acquiring according to the system bandwidth, where the system bandwidth has a predefined corresponding relation with the hierarchical nesting manner; acquiring according to an indication of a broadcast channel; or acquiring according to an indication of a synchronization channel.

Alternatively, the first receiving module is further configured to receive the indication information through which the base station indicates one or more of the resource units by receiving multiple levels of signaling. Each of the multiple levels of signaling is configured to indicate at least one granularity of resource units among the resource units of multiple granularities.

Alternatively, the multiple levels of signaling include physical control signaling carried by multiple levels of physical control channels; or the multiple levels of signaling at least include higher layer signaling and physical layer control signaling.

Alternatively, the resource units of multiple granularities have a same subcarrier spacing; and/or, the resource units of multiple granularities have a same symbol length and cyclic shift length.

Alternatively, the resources used for receiving the communication signal include one of: frequency domain resources corresponding to the system bandwidth, frequency domain resources supported by the terminal, frequency domain resources specified in the frequency domain resources corresponding to the system bandwidth, and frequency domain resources specified in the frequency domain resources supported by the terminal.

Figure 15:
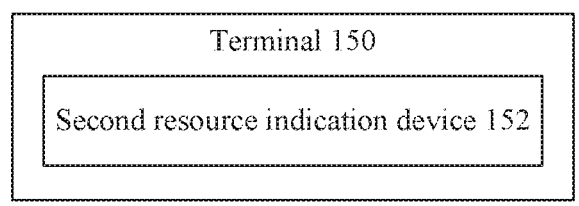
FIG. 15 is a structural block diagram of a terminal according to an embodiment of the present disclosure.

FIG. 15 is a structural block diagram of a terminal according to an embodiment of the present disclosure. As shown in FIG. 15, the terminal 150 includes any one of the second resource indication devices 152 described above.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

The embodiments of the present disclosure further provide a storage medium. Optionally, in the present embodiment, the storage medium may be configured to store program codes for performing steps described below:

In S1, resource units of multiple granularities are defined in a hierarchical nesting manner for a communication signal.

In S2, one or more of the resource units are indicated to the terminal.

Alternatively, the storage medium is further configured to store program codes for executing a step described below:

In S1, the communication signal includes at least one of: a control signal, a data signal, a demodulation reference signal, a sounding reference signal, a positioning signal, a synchronization signal, a random access signal, a time and/or frequency domain tracking reference signal, or a radio resource management measurement reference signal.

Alternatively, the storage medium is further configured to store program codes for executing a step described below:

In S1, the resource unit includes at least one of: a sub-band in a frequency domain or a time unit group in a time domain. The sub-band includes one or more physical resource blocks in the frequency domain. The time unit group includes one or more time units. The time unit includes one of: a slot, a subframe, a symbol, a frame, or a mini-slot.

Alternatively, the storage medium is further configured to store program codes for executing a step described below:

In S1, defining resource units of multiple granularities for a communication signal in a hierarchical nesting manner includes: dividing resources for transmitting the communication signal into multiple levels to obtain multiple levels of resource units, where each level of resource units at least include a resource unit with one granularity, and the multiple levels of resource units have a nested relationship.

Alternatively, the storage medium is further configured to store program codes for executing a step described below:

the process of dividing the resources for transmitting the communication signal into multiple levels to obtain multiple levels of resource units includes:

in S1, dividing the resources for transmitting the communication signal into N levels, where the ith level includes $L_i$ resource units, and the N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers Alternatively, the storage medium is further configured to store program codes for executing a step described below:

the process of dividing the resources for receiving the communication signal into N levels includes:

in S1, when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, the storage medium is further configured to store program codes for executing a step described below:

In S1, any two resource units at the same level have the same granularity.

Alternatively, the storage medium is further configured to store program codes for executing a step described below:

In S1, after defining in the hierarchical nesting manner the resource units of multiple granularities for the communication signal, the method further includes numbering the resource units of multiple granularities in a predefined manner.

Alternatively, the storage medium is further configured to store program codes for executing a step described below:

In S1, the step of numbering the resource units of multiple granularities in the predefined manner includes at least one of: numbering the resource units from a smallest number to a largest number according to a largest-to-smallest order or a smallest-to-largest order of the granularities of the resource units; numbering the resource units from a smallest number to a largest number according to a largest-to-smallest order or a smallest-to-largest order of hierarchical indexes of the resource units; numbering the resource units from a smallest number to a largest number according to a highest-to-lowest order or a lowest-to-highest order or a center-to-edge order of frequency domains of the resource units; or numbering the resource units from a smallest number to a largest number according to a front-to-end order or an end-to-front order of time domains of the resource units.

Alternatively, the storage medium is further configured to store program codes for executing a step described below:

In S1, the step of numbering the resource units of multiple granularities in the predefined manner includes: respectively numbering resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, the storage medium is further configured to store program codes for executing a step described below:

the step of numbering the resource units of multiple granularities in the predefined manner includes:

In S1, respectively numbering one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: according to a highest-to-lowest order or a lowest-to-highest order or a center-to-edge order of frequency domains of the one or more resource units, numbering the one or more resource units with a smaller granularity from a smallest number to a largest number; or according to a front-to-end order or an end-to-front order of time domains of the one or more resource units, numbering the one or more resource units with a smaller granularity from a smallest number to a largest number.

Alternatively, the storage medium is further configured to store program codes for executing a step described below:

the step of numbering the resource units of multiple granularities in the predefined manner includes:

In S1, numbering resource units whose frequency domains are closely adjacent to a center frequency with a same number; or numbering resource units whose frequency domains have the same distance from the center frequency domain with the same number.

Alternatively, the storage medium is further configured to store program codes for executing a step described below:

indicating one or more of the resource units to the terminal by the following manner:

In S1: indicating one or more of the resource units to the terminal by indicating one or more numbers to the terminal, and one number corresponds to one or more resource units.

Alternatively, the storage medium is further configured to store program codes for executing a step described below:

In S1, one or more of the resource units are indicated to the terminal by the following manner: indicating one or more of the resource units to the terminal via one or more sets of signaling, and one set of signaling is configured for indicating one number.

Alternatively, the storage medium is further configured to store program codes for executing a step described below:

In S1, after defining the resource units of multiple granularities in the hierarchical nesting manner for the communication signal, the method further includes indicating resource unit granularity information of the hierarchical nesting manner and/or a number of levels corresponding to the hierarchical nesting manner.

Alternatively, the storage medium is further configured to store program codes for executing a step described below:

In S1, the resource unit granularity information of the hierarchical nesting manner and/or the number of levels corresponding to the hierarchical nesting manner is indicated to the terminal by at least one of the following manners: indicating according to the system bandwidth, where the system bandwidth has a predefined corresponding relation with the hierarchical nesting manner; indicating by a broadcast channel; or indicating by a synchronization signal.

Alternatively, the storage medium is further configured to store program codes for executing a step described below.

The step of indicating one or more of the resource units to the terminal includes:

In S1, indicating one or more of the resource units to the terminal via multiple levels of signaling, and each of the multiple levels of signaling is configured to indicate at least one granularity of resource units among the resource units of multiple granularities.

Alternatively, the storage medium is further configured to store program codes for executing a step described below:

In S1, the multiple levels of signaling are physical control signaling carried by multiple levels of physical control channels; or the multiple levels of signaling at least include higher layer signaling and physical layer control signaling.

Alternatively, the storage medium is further configured to store program codes for executing a step described below:

In S1, the resource units of multiple granularities have a same subcarrier spacing; and/or, the resource units of multiple granularities have a same symbol length and cyclic shift length.

Alternatively, the storage medium is further configured to store program codes for executing a step described below:

In S1, the resources used for transmitting the communication signal include one of: frequency domain resources corresponding to the system bandwidth, frequency domain resources supported by the terminal, frequency domain resources specified in the frequency domain resources corresponding to the system bandwidth, and frequency domain resources specified in the frequency domain resources supported by the terminal.

Another embodiment of the present disclosure further provides a storage medium. The storage medium is configured to store program codes for executing steps described below:

In S1, resource unit of multiple granularities are defined in the hierarchical nesting manner for a communication signal.

In S2, an indication information through which the base station indicates one or more of the resource units is received.

In S3, the communication signal is attempted to be received on one or more resource units indicated by the indication information.

Alternatively, the storage medium is further configured to store program codes for executing a step described below:

In S1, the communication signal includes at least one of: a control signal, a data signal, a demodulation reference signal, a sounding reference signal, a positioning signal, a synchronization signal, a random access signal, a time and/or frequency domain tracking reference signal, or a radio resource management measurement reference signal.

Alternatively, the storage medium is further configured to store program codes for executing a step described below:

In S1, the resource unit includes at least one of: a sub-band in a frequency domain or a time unit group in a time domain. The sub-band includes one or more physical resource blocks in the frequency domain. The time unit group includes one or more time units, and the time unit includes one of: a slot, a subframe, a symbol, a frame, or a mini-slot.

Alternatively, the storage medium is further configured to store program codes for executing a step described below:

In S1, defining the resource units of multiple granularities in a hierarchical nesting manner for the communication signal includes: dividing the resources for receiving the communication signal into multiple levels to obtain multiple levels of resource units. Each level of resource units at least include one granularity of resource unit, and the multiple levels of resource units have a nested relationship.

Alternatively, the storage medium is further configured to store program codes for executing a step described below:

In S1, dividing the resources for receiving the communication signal into multiple levels to obtain multiple levels of resource units includes: dividing the resources for transmitting the communication signal into N levels, where the resources are divided into $L_i$ resource units in the ith level, and N levels of resource units satisfy $L_0 \leq L_1 \leq \ldots \leq L_{N-1}$, where $i \in \{0 \sim N-1\}$, N is an integer greater than 1, and i and $L_i$ are both nonnegative integers.

Alternatively, the storage medium is further configured to store program codes for executing a step described below.

The step of dividing the resources for receiving the communication signal into N levels includes:

In S1, when i=0, resource units in the 0th level are frequency domain resources for transmitting the communication signal; and/or, when i>0, resource units in the ith level are obtained by: dividing each resource unit in the (i−1)th level into Q resource units with a smaller granularity, where Q is an integer greater than 1 and satisfies the following relationship $L_{i+1}=L_i \times Q$.

Alternatively, the storage medium is further configured to store program codes for executing a step described below:

In S1, any two resource units at the same level have the same granularity.

Alternatively, the storage medium is further configured to store program codes for executing a step described below:

In S1, after defining the resource units of multiple granularities in the hierarchical nesting manner for the communication signal, the method further includes numbering the resource units of multiple granularities in a predefined manner.

Alternatively, the storage medium is further configured to store program codes for executing a step described below:

In S1, the step of numbering the resource units of multiple granularities in the predefined manner includes at least one of: according to a largest-to-smallest order or a smallest-to-largest order of the granularities of the resource units, numbering the resource units from a smallest number to a largest number; according to a largest-to-smallest order or a smallest-to-largest order of hierarchical indexes of the resource units, numbering the resource units from a smallest number to a largest number; according to a highest-to-lowest order or a lowest-to-highest order or a center-to-edge order of frequency domains of the resource units, numbering the resource units from a smallest number to a largest number; or according to a front-to-end order or an end-to-front order of time domains of the resource units, numbering the resource units from a smallest number to a largest number.

Alternatively, the storage medium is further configured to store program codes for executing a step described below:

In S1, the step of numbering the resource units of multiple granularities in the predefined manner includes: respectively numbering resource units of the same level or the same resource granularity according to at least one of the following manners: numbering the resource units from a smallest number to a largest number according to a highest-to-lowest order or a lowest-to-highest order or a center-to-edge order of frequency domains of the resource units; or, numbering the resource units from a smallest number to a largest number according to a front-to-end order or an end-to-front order of time domains of the resource units.

Alternatively, the storage medium is further configured to store program codes for executing a step described below:

In S1, the step of numbering the resource units of multiple granularities in the predefined manner includes: respectively numbering one or more resource units in the ith level corresponding to a resource unit in (i−1)th level, where the one or more resource units in the ith level have a same resource position as the resource unit in (i−1)th level and have a smaller granularity than the resource unit in (i−1)th level, where i>0, in at least one of the following manners: numbering the one or more resource units with a smaller granularity from a smallest number to a largest number according to a highest-to-lowest order or a lowest-to-highest order or a center-to-edge order of frequency domains of the one or more resource units; or, numbering the one or more resource units with a smaller granularity from a smallest number to a largest number according to a front-to-end order or an end-to-front order of time domains of the one or more resource units.

Alternatively, the storage medium is further configured to store program codes for executing a step described below:

In S1, the step of numbering the resource units of the multiple granularities in the predefined manner includes: numbering resource units whose frequency domains are closely adjacent to a center frequency with a same number; or numbering resource units whose frequency domains have the same distance from the center frequency domain with the same number.

Alternatively, the storage medium is further configured to store program codes for executing a step described below:

In S1, the indication information through which the base station indicates one or more of the resource units is received by the following manner: receiving indication information through which the base station indicates one or more of the resource units by means of receiving one or more numbers indicated by the base station, where one number corresponds to one or more resource units.

Alternatively, the storage medium is further configured to store program codes for executing a step described below:

In S1, the indication information through which the base station indicates one or more of the resource units is received by the following manner: receiving indication information through which the base station indicates one or more resource units via one or more sets of signaling, where one set of signaling is configured for indicating one number.

Alternatively, the storage medium is further configured to store program codes for executing a step described below:

In S1, before defining the resource units of multiple granularities in the hierarchical nesting manner for the communication signal, the method further includes receiving resource unit granularity information in the hierarchical nesting manner and/or a number of levels corresponding to the hierarchical nesting manner.

Alternatively, the storage medium is further configured to store program codes for executing a step described below:

In S1, the resource unit granularity information in the hierarchical nesting manner and/or the number of levels corresponding to the hierarchical nesting manner is received by at least one of the following manners: the resource unit granularity information and/or the number of levels is received according to the system bandwidth, where the system bandwidth has a predefined corresponding relationship with the hierarchical nesting manner; the resource unit granularity information and/or the number of levels is received by the indication of the broadcast channel; or the resource unit granularity information and/or the number of levels is received by the indication of the synchronization channel.

Alternatively, the storage medium is further configured to store program codes for executing a step described below:

In S1, the step of receiving the indication information used by the base station for indicating one or more of the resource units includes: receiving the indication information used by the base station for indicating one or more of the resource units by receiving multiple levels of signaling, where each of the multiple levels of signaling is configured to indicate at least one granularity of resource units among the resource units of multiple granularities.

Alternatively, the storage medium is further configured to store program codes for executing a step described below:

In S1, the multiple levels of signaling are physical control signaling carried by multiple levels of physical control channels; or the multiple levels of signaling at least include higher layer signaling and physical layer control signaling.

Alternatively, the storage medium is further configured to store program codes for executing a step described below:

In S1, the resource units of multiple granularities have a same subcarrier spacing; and/or, the resource units of multiple granularities have a same symbol length and cyclic shift length.

Alternatively, the storage medium is further configured to store program codes for executing a step described below:

In S1, the resources used for receiving the communication signal include one of: frequency domain resources corresponding to the system bandwidth, frequency domain resources supported by the terminal, frequency domain resources specified in the frequency domain resources corresponding to the system bandwidth, and frequency domain resources specified in the frequency domain resources supported by the terminal.

Optionally, in the present embodiment, the storage medium may include, but is not limited to, a USB flash disk, a read-only memory (ROM), a random access memory (RAM), a mobile hard disk, a magnetic disk, an optical disk, or other medium capable of storing program codes.

Alternatively, in the present embodiment, a processor executes the steps of the resource indication method described above according to the program codes stored in the storage medium.

Alternatively, for specific examples of this embodiment, reference may be made to the examples described in the above embodiments and optional embodiments, and repetition will not be made in this embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

The present disclosure is applicable to the field of communications, and is intended to solve the problem in the related art that the communication signal transmission on a full system bandwidth has high complexity and low efficiency is solved. The flexibly defining and indicating the resources of the communication signal are realized. The present disclosure is not only easy to operate, but also is favorable to improving the transmission efficiency of communication signal.

What is claimed is:

1. A resource indication method, comprising:
defining, in a hierarchical nesting manner, resource units of multiple granularities for a communication signal; and
indicating one or more of the resource units to a terminal;
wherein defining, in a hierarchical nesting manner, resource units of multiple granularities for a communication signal comprises:
dividing resources for transmitting the communication signal into multiple levels to obtain multiple levels of resource units, wherein each level of resource units comprise at least one granularity of resource units, and the multiple levels of resource units have a nested relationship;

wherein dividing resources for transmitting the communication signal into multiple levels to obtain multiple levels of resource units comprises:

dividing resources for transmitting the communication signal into N levels, wherein an ith level comprises $L_i$ resource units, and N levels of resource units satisfy $L_0 \leq L_1 \leq \ldots \leq L_{N-1}$, wherein $i \in \{0 \sim N-1\}$, N is an integer greater than 1, and i and $L_i$ are both nonnegative integers.

2. The method of claim 1, wherein the communication signal comprises at least one of: a control signal, a data signal, a demodulation reference signal, a sounding reference signal, a positioning signal, a synchronization signal, a random access signal, a time domain and/or frequency domain tracking reference signal, or a radio resource management measurement reference signal.

3. The method of claim 1, wherein the resource unit comprises at least one of: a sub-band in a frequency domain or a time unit group in a time domain; wherein the sub-band comprises one or more physical resource blocks in the frequency domain; and wherein the time unit group comprises one or more time units, and the time unit comprises one of: a slot, a subframe, a symbol, a frame, or a mini-slot.

4. The method of claim 1, wherein dividing resources for transmitting the communication signal into N levels comprises:

when i=0, resource units in the 0th level are frequency domain resources for transmitting the communication signal; and/or, when i>0, resource units in the ith level are obtained by: dividing each resource unit in the (i−1)th level into Q resource units with a smaller granularity, wherein Q is an integer greater than 1 and satisfies the following relationship $L_{i+1} = L_i \times Q$.

5. The method of claim 1, wherein any two resource units in the same level have a same granularity.

6. The method of claim 1, further comprising: numbering the resource units of multiple granularities in a predefined manner.

7. The method of claim 6, wherein numbering the resource units of multiple granularities in the predefined manner comprises at least one of:

according to a largest-to-smallest order or a smallest-to-largest order of the granularities of the resource units, numbering the resource units from a smallest number to a largest number;

according to a largest-to-smallest order or a smallest-to-largest order of hierarchical indexes of the resource units, numbering the resource units from a smallest number to a largest number;

according to a highest-to-lowest order or a lowest-to-highest order or a center-to-edge order of frequencies of the resource units, numbering the resource units from a smallest number to a largest number; or according to a front-to-end order or an end-to-front order of time domains of the resource units, numbering the resource units from a smallest number to a largest number.

8. The method of claim 6, wherein numbering the resource units of multiple granularities in the predefined manner comprises: respectively numbering resource units of the same level or the same resource granularity according to at least one of the following manners:

according to a highest-to-lowest order or a lowest-to-highest order or a center-to-edge order of frequencies of the resource units, numbering the resource units from a smallest number to a largest number; or according to a front-to-end order or an end-to-front order of time domains of the resource units, numbering the resource units from a smallest number to a largest number.

9. A resource indication method, comprising:

defining, in a hierarchical nesting manner, resource units of multiple granularities for a communication signal;

receiving, from a base station, indication information for indicating one or more resource units of the resource units; and attempting to receive the communication signal on the one or more resource units indicated by the indication information;

wherein defining, in a hierarchical nesting manner, resource units of multiple granularities for a communication signal comprises:

dividing resources for receiving the communication signal into multiple levels to obtain multiple levels of resource units, wherein each level of resource units comprise at least one granularity of resource units, and the multiple levels of resource units have a nested relationship;

wherein dividing resources for receiving the communication signal into multiple levels to obtain multiple levels of resource units comprises:

dividing resources for receiving the communication signal into N levels, wherein an ith level comprises $L_i$ resource units, the N levels of resource units satisfy $L_0 \leq L_1 \leq \ldots \leq L_{N-1}$, wherein $i \in \{0 \sim N-1\}$, N is an integer greater than 1, and i and $L_i$ are both nonnegative integers.

10. The method of claim 9, wherein the communication signal comprises at least one of: a control signal, a data signal, a demodulation reference signal, a sounding reference signal, a positioning signal, a synchronization signal, a random access signal, a time domain and/or frequency domain tracking reference signal, or a radio resource management measurement reference signal.

11. The method of claim 9, wherein the resource unit comprises at least one of: a sub-band in a frequency domain or a time unit group in a time domain; wherein the sub-band comprises one or more physical resource blocks in the frequency domain; and wherein the time unit group comprises one or more time units, and the time unit comprises one of: a slot, a subframe, a symbol, a frame, or a mini-slot.

12. The method of claim 9, wherein dividing the resources for receiving the communication signal into N levels comprises:

when i=0, resource units in the 0th level are frequency domain resources for receiving the communication signal; and/or, when i>0, resource units in the ith level are obtained by: dividing each resource unit in the (i−1)th level into Q resource units with a smaller granularity, wherein Q is an integer greater than 1 and satisfies the following relationship $L_{i+1} = L_i \times Q$.

13. The method of claim 9, wherein any two resource units at the same level have a same granularity.

14. The method of claim 9, further comprising: numbering the resource units of multiple granularities in a predefined manner.

15. The method of claim 14, wherein numbering the resource units with the multiple granularities in the predefined manner comprises at least one of:
- according to a largest-to-smallest order or a smallest-to-largest order of the granularities of the resource units, numbering the resource units from a smallest number to a largest number;
- according to a largest-to-smallest order or a smallest-to-largest order of hierarchical indexes of the resource units, numbering the resource units from a smallest number to a largest number;
- according to a highest-to-lowest order or a lowest-to-highest order or a center-to-edge order of frequencies of the resource units, numbering the resource units from a smallest number to a largest number; or
- according to a front-to-end order or an end-to-front order of time domains of the resource units, numbering the resource units from a smallest number to a largest number.

16. The method of claim 14, wherein numbering the resource units of multiple granularities in the predefined manner comprises: respectively numbering resource units of the same level or the same resource granularity according to at least one of the following manners:
- according to a highest-to-lowest order or a lowest-to-highest order or a center-to-edge order of frequencies of the resource units, numbering the resource units from a smallest number to a largest number; or
- according to a front-to-end order or an end-to-front order of time domains of the resource units, numbering the resource units from a smallest number to a largest number.

17. A terminal, comprising:
a processor; and
a memory connected to the processor, wherein the memory stores instructions executable by the processor,
wherein execution of the instructions by the processor causes the processor to:
define, in a hierarchical nesting manner, resource units of multiple granularities for a communication signal;
receive, from a base station, indication information for indicating one or more resource units of the resource units; and
receive the communication signal on the one or more resource units indicated by the indication information;
wherein execution of the instructions by the processor further causes the processor to:
divide resources for receiving the communication signal into multiple levels to obtain multiple levels of resource units, wherein each level of resource units comprise at least one granularity of resource units, and the multiple levels of resource units have a nested relationship;
wherein execution of the instructions by the processor further causes the processor to:
divide resources for receiving the communication signal into N levels, wherein an ith level comprises $L_i$ resource units, the N levels of resource units satisfy $L_0 \leq L_1 \leq \ldots \leq L_{N-1}$, wherein $i \in \{0 \sim N-1\}$, N is an integer greater than 1, and i and $L_i$ are both nonnegative integers.

* * * * *